US012283210B2

(12) United States Patent
Lee et al.

(10) Patent No.: US 12,283,210 B2

(45) Date of Patent: *Apr. 22, 2025

(54) DISPLAY DEVICE AND METHOD OF DRIVING THE SAME

(71) Applicant: SAMSUNG DISPLAY CO., LTD., Yongin-si (KR)

(72) Inventors: Jae Hoon Lee, Yongin-si (KR); Jong Wook Kim, Yongin-si (KR); Kyoung Ho Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/365,393

(22) Filed: Aug. 4, 2023

(65) Prior Publication Data

US 2023/0377496 A1 Nov. 23, 2023

Related U.S. Application Data

(63) Continuation of application No. 17/833,767, filed on Jun. 6, 2022, now Pat. No. 11,727,839, which is a (Continued)

(30) Foreign Application Priority Data

Feb. 26, 2020 (KR) ........................ 10-2020-0023867

(51) Int. Cl.

*G09G 3/32* (2016.01)
*G09G 3/00* (2006.01)

(Continued)

(52) U.S. Cl.

CPC ........... *G09G 3/007* (2013.01); *G09G 3/2003* (2013.01); *G09G 3/3208* (2013.01); *G09G 2340/04* (2013.01); *G09G 2340/06* (2013.01)

(58) Field of Classification Search

CPC .. G09G 3/007; G09G 3/2003; G09G 2340/04; G09G 2340/06

See application file for complete search history.

(56) References Cited

U.S. PATENT DOCUMENTS

| | | | |
|---|---|---|---|
| 7,929,000 | B2 | 4/2011 | Inoue |
| 10,559,250 | B2 | 2/2020 | Chun et al. |

(Continued)

FOREIGN PATENT DOCUMENTS

| | | | |
|---|---|---|---|
| CN | 101627417 A | 1/2010 | |
| JP | 2010-204515 A | 9/2010 | |

(Continued)

OTHER PUBLICATIONS

Chinese Office Action dated Mar. 6, 2025 regarding Chinese Patent Application No. 202110191535.1 corresponding to U.S. Appl. No. 18/365,393 (8 pages).

*Primary Examiner* — Towfiq Elahi

(74) *Attorney, Agent, or Firm* — Womble Bond Dickinson (US) LLP

(57) ABSTRACT

A display device and a method of driving the same are provided. The method of driving the display includes a display area to display an image. The method includes performing a first first pixel shift driving by shifting an image by a first range in the display area without loss of image information due to enlargement or reduction of the image, checking whether a change of a block grayscale value is greater than or equal to a threshold in an interest area in the display area, and performing second pixel shift driving by shifting an image having the loss of image information.

20 Claims, 16 Drawing Sheets

Related U.S. Application Data continuation of application No. 17/171,505, filed on Feb. 9, 2021, now Pat. No. 11,355,042.

(51) Int. Cl.
*G09G 3/20* (2006.01)
*G09G 3/3208* (2016.01)

(56) References Cited

U.S. PATENT DOCUMENTS

| | | | | |
|---|---|---|---|---|
| 2008/0111886 | A1 | 5/2008 | Bai | |
| 2009/0295768 | A1 | 12/2009 | Shin et al. | |
| 2010/0315449 | A1 | 12/2010 | Chaji et al. | |
| 2016/0225349 | A1* | 8/2016 | Lee .......................... | G09G 5/34 |
| 2016/0320916 | A1 | 11/2016 | Chun et al. | |
| 2016/0329008 | A1 | 11/2016 | Chun et al. | |
| 2017/0115821 | A1 | 4/2017 | Chun et al. | |
| 2018/0012563 | A1 | 1/2018 | Lee et al. | |
| 2018/0197489 | A1 | 7/2018 | Nakahara | |
| 2020/0090602 | A1 | 3/2020 | Li et al. | |
| 2020/0226992 | A1 | 7/2020 | Lee et al. | |

FOREIGN PATENT DOCUMENTS

| | | | |
|---|---|---|---|
| JP | 2011-253027 | A | 12/2011 |
| JP | 2018-112728 | A | 7/2018 |
| KR | 10-2007-0010710 | A | 1/2007 |
| KR | 10-2008-0042997 | A | 5/2008 |
| KR | 10-2018-0006584 | A | 1/2018 |
| KR | 10-2019-0032709 | A | 3/2019 |
| KR | 10-2020-0088546 | A | 7/2020 |
| KR | 10-2016-0043548 | A | 6/2021 |
| KR | 10-2019-0033313 | A | 8/2022 |
| KR | 10-2019-0126676 | A | 12/2022 |

* cited by examiner

DISPLAY DEVICE AND METHOD OF DRIVING THE SAME

CROSS-REFERENCE TO RELATED APPLICATIONS

This application is a continuation of U.S. patent application Ser. No. 17/833,767, filed Jun. 6, 2022, which is a continuation of U.S. patent application Ser. No. 17/171,505, filed Feb. 9, 2021, now U.S. Pat. No. 11,355,042, which claims priority to and the benefit of Korean Patent Application No. 10-2020-0023867, filed Feb. 26, 2020, the entire content of all of which is incorporated herein by reference.

BACKGROUND

1. Field

The disclosure relates to a display device and a method of driving the same.

2. Description of the Related Art

Recently, various types of display devices such as an organic light emitting display device, a liquid crystal display device, and a plasma display device have been widely used.

Because these display devices continuously output a specific image or text for a long time (e.g., as a result of their long driving time), one or more pixels of the display may deteriorate and a reduction or deterioration in performance of the display may occur.

In order to prevent or reduce the deterioration of pixels of a display caused by the long driving time, a method of shifting and displaying an image on a display panel at a regular period (e.g., pixel shift technique) may be used. When an image is shifted and displayed on a display panel at a regular period, an output of the same data to a specific pixel for a long time may be prevented or reduced and therefore deterioration of the pixels may be reduced as well.

SUMMARY

One or more embodiments of the present disclosure provide a display device configured to reduce or minimize recognition of image shift by a user while reducing deterioration of a pixel.

One or more embodiments of the present disclosure are not limited to the above-described aspects, and other technical aspects that are not described will be clearly understood by those skilled in the art from the following description.

In one or more embodiments of the present disclosure, a method of driving a display device including a display area to display an image is provided. The method includes performing a first first pixel shift driving by shifting an image by a first range in the display area without loss of image information due to enlargement or reduction of the image, checking whether a change of a block grayscale value is greater than or equal to a threshold in an interest area in the display area, and performing a second pixel shift driving by shifting an image having the loss of image information.

In one or more embodiments, the checking whether the change of the block grayscale value is greater than or equal to the threshold in the interest area includes performing a second first pixel shift driving when the change of the block grayscale value is less than the threshold; and performing the second pixel shift driving when the change of the block grayscale value is greater than or equal to the threshold.

In one or more embodiments, the method further includes performing the checking whether the change of the block grayscale value is greater than or equal to the threshold in the interest area after the second pixel shift driving, and performing the second first pixel shift driving.

In one or more embodiments, in the first first pixel shift driving, the image shift may start at a first point and stop at a second point, in the second pixel shift driving, the image shift may start at the first point and stop at a third point, and in the second first pixel shift driving, the image shift may start at the second point.

In one or more embodiments, in the second pixel shift driving, the image shift of the first range or a second range may be performed, and the second range may be less than the first range.

In one or more embodiments, the image may not be enlarged or reduced in the second pixel shift driving.

In one or more embodiments, the display area may include an edge scaling area enlarged or reduced by the image shift of the second pixel shift driving.

In one or more embodiments, the interest area includes a plurality of the interest areas.

In one or more embodiments, the plurality of interest areas may be positioned to be in contact with edges of the display area, respectively.

In one or more embodiments, the image may include a scroll area in which a subtitle, text information, or the like shifts in at least some sections, and the interest area may be positioned to include at least a portion of the scroll area.

In one or more embodiments, when the subtitle, the text information, or the like, shifts in the interest area, the change of the block grayscale value may be greater than or equal to the threshold.

In one or more embodiments, the block grayscale value may be a sum of grayscale values of a plurality of pixels in a pixel block.

In one or more embodiments, in the second pixel shift driving, a portion of a first area of the image before shift may be reduced or enlarged and displayed after the image shift of the second range, and a remaining portion of the first area may not be displayed.

A display device according to one or more embodiments of the present disclosure includes an image corrector configured to generate second image data based on first image data, a data driver configured to generate a data signal based on the first image data or the second image data, and a display panel including a display area to display an image, the display area including pixels to emit light at a luminance corresponding to the data signal. The display panel performs a first first pixel shift driving by shifting an image by a first range in the display area without loss of image information due to enlargement or reduction of the image, and performs a second pixel shift driving having the loss of image information.

In one or more embodiments, the image corrector may correct the first image data to generate the second image data and to perform an image shift on the image along a shift path.

In one or more embodiments, the image corrector includes a shift determiner configured to determine a shift direction and a shift amount of the image.

In one or more embodiments, the image corrector may further include an area determiner configured to determine an area in which the image is enlarged or reduced.

In one or more embodiments, the display panel may perform the first first pixel shift driving, and may perform the second pixel shift driving when a change of a block grayscale value in an interest area in the display area is greater than or equal to a threshold.

In one or more embodiments, the display panel may perform the first first pixel shift driving, and may perform a second first pixel shift driving when the change of the block grayscale value in the interest area in the display area is less than the threshold.

In one or more embodiments, an image shift of a second range less than the first range may be performed in the second pixel shift driving.

In one or more embodiments, the loss of image information in which a portion of the image is not displayed may occur due to the image shift, in the second pixel shift driving.

Details of other embodiments are included in the detailed description and drawings.

According to one or more embodiments of the disclosure, deterioration of the pixel may be improved and recognition of the image shift to a user may be minimized or reduced.

The effect according to the embodiments is not limited by the details illustrated above, but more various effects are included in the present disclosure.

BRIEF DESCRIPTION OF THE DRAWINGS

The above and other features of the disclosure will become more apparent by describing in further detail embodiments thereof with reference to the accompanying drawings, in which.

DETAILED DESCRIPTION

Figure 1:
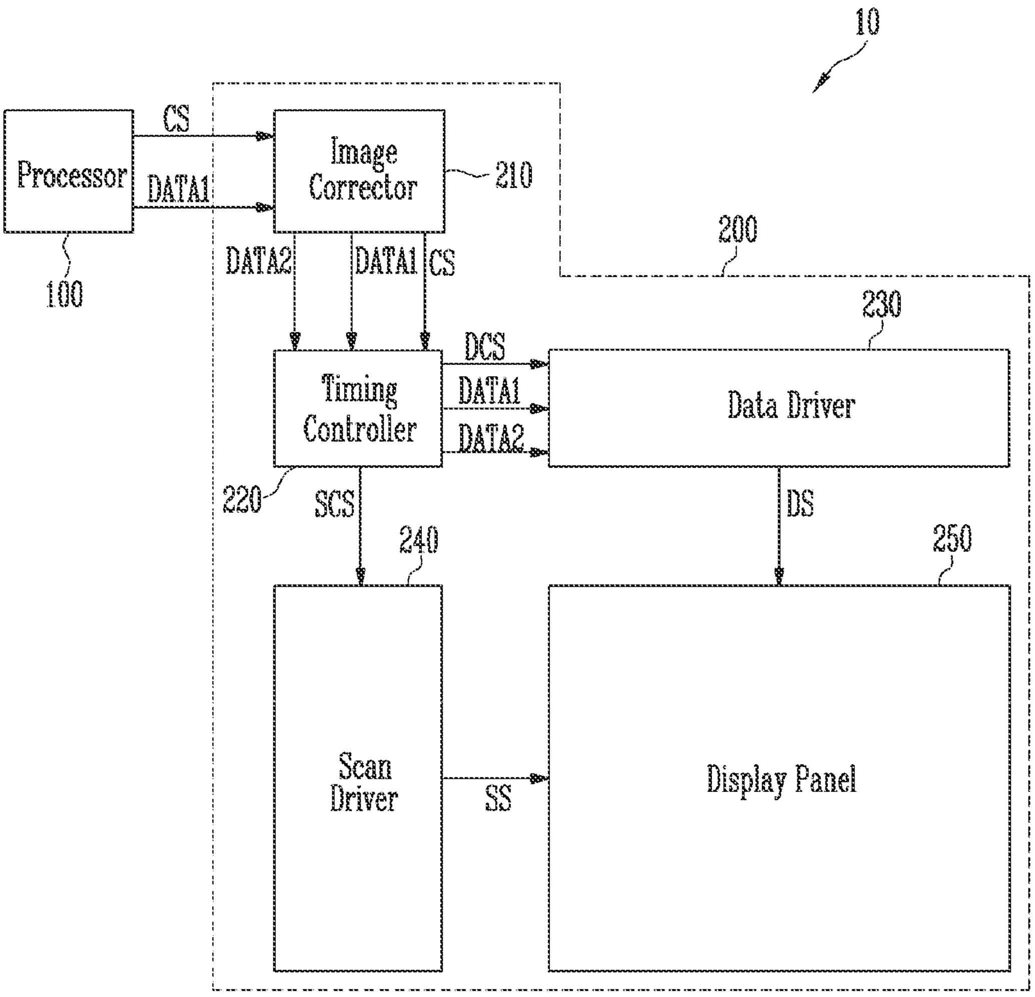
FIG. 1 is a schematic block diagram of a display device according to one or more embodiments of the present disclosure.

The features and aspects of the present disclosure and a method of achieving them will become apparent with reference to the embodiments described in detail below together with the accompanying drawings. However, the disclosure is not limited to the embodiments disclosed below, and may be implemented in various different forms. The present embodiments are provided so that the disclosure will be thorough and complete and those skilled in the art to which the disclosure pertains can fully understand the scope of the disclosure. The disclosure is only defined by the scope of the claims.

Although a first, a second, and the like are used to describe various components, these components are not limited by these terms. These terms are used only to distinguish one component from another component. Therefore, a first component mentioned below may be a second component within the technical spirit of the disclosure. Singular expressions include plural expressions unless the context clearly indicates otherwise.

Spatially relative terms, such as “beneath”, “below”, “lower”, “under”, “above”, “upper” and the like, may be used herein for ease of description to describe one element or feature’s relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as “below” or “beneath” or “under” other elements or features would then be oriented “above” the other elements or features. Thus, the example terms “below” and “under” can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being “between” two layers, it can be the only layer between the two layers, or one or more intervening layers may also be present.

The terminology used herein is for the purpose of describing particular embodiments only and is not intended to be limiting of the present disclosure. As used herein, the terms “substantially,” “about,” and similar terms are used as terms of approximation and not as terms of degree, and are intended to account for the inherent deviations in measured or calculated values that would be recognized by those of ordinary skill in the art.

As used herein, the singular forms “a” and “an” are intended to include the plural forms as well, unless the context clearly indicates otherwise. It will be further understood that the terms “comprises” and/or “comprising”, when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present disclosure refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Hereinafter, embodiments of the present disclosure will be described in detail with reference to the accompanying drawings. The same or similar reference numerals are used for the same components in the drawings.

Figure 2:
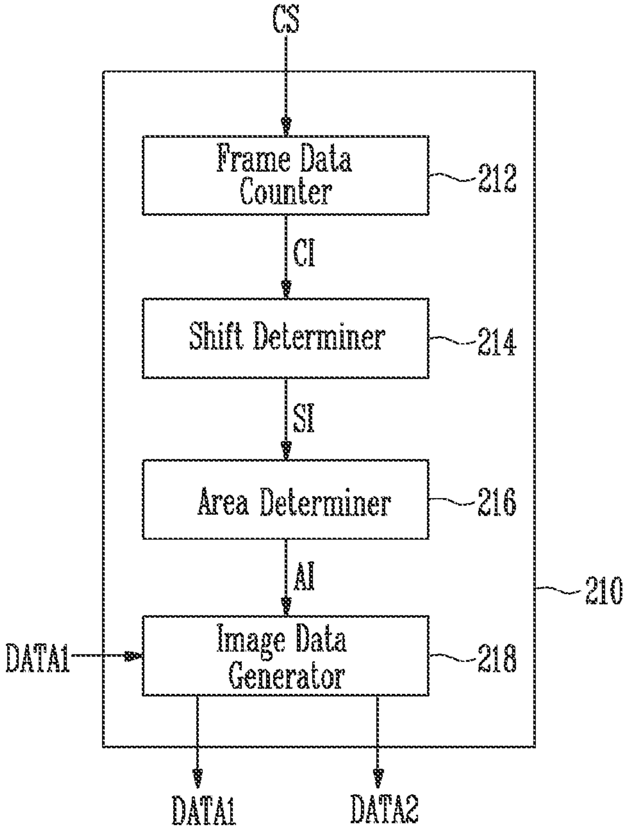
FIG. 2 is a schematic block diagram of an image corrector shown in FIG. 1.

FIG. 1 is a schematic block diagram of a display device according to one or more embodiments of the present disclosure. FIG. 2 is a schematic block diagram of an image corrector shown in FIG. 1.

Referring to FIGS. 1 and 2, the display device 10 includes a processor 100 and a display unit 200.

According to one or more embodiments, the display device 10 may be any one of a personal computer (PC), a smart phone, a tablet PC, a mobile Internet device (MID), an Internet tablet, Internet of things (IoT), an Internet of everything (IOE) device, a desktop computer, a laptop computer, a workstation computer, and a personal digital assistant (PDA), but is not limited thereto.

The processor 100 may generate first image data DATA1 and a control signal CS for controlling the driving of the display unit 200 and may supply the first image data DATA1 and the control signal CS to the display unit 200.

According to one or more embodiments, the processor 100 may be implemented as an application processor (AP), a mobile AP, a central processing unit (CPU), a graphic processing unit (GPU), or a processor capable of controlling an operation of the display unit 200, but is not limited thereto.

The display unit 200 may include an image corrector 210, a timing controller 220, a data driver 230, a scan driver 240, and a display panel 250.

The image corrector 210 may receive the first image data DATA1 and the control signal CS from the processor 100 as an input and may generate second image data DATA2 based on the first image data DATA1. The image corrector 210 may also output the first image data DATA1 and the control signal CS along with the second image data DATA2. Here, the first image data DATA1 may refer to an image data corresponding to a first image displayed in a first area of a display area of the display panel 250, and the second image data DATA2 may refer to an image data corresponding to a second image displayed in a second area of the display area. In one or more embodiments, the second image may refer to an image generated by shifting the first image by a pixel shift.

In FIG. 1, the image corrector 210 is implemented inside the display unit 200, however, according to one or more embodiments, the image corrector 210 may be implemented inside the processor 100 or may be implemented inside the timing controller 220.

The image corrector 210 may include a frame data counter 212, a shift determiner 214, an area determiner 216, and an image data generator 218.

The frame data counter 212 may count the number of inputs of a frame based on the first image data DATA1 and the control signal CS, and may generate frame information CI including the number of inputs of the frame.

According to one or more embodiments, the frame data counter 212 may count the number of inputs of the frame using the control signal CS. For example, the frame data counter 212 may count the number of inputs of the frame by determining the number of inputs of a vertical synchronization signal included in the control signal CS.

The shift determiner 214 may determine a shift direction and a shift amount of the image using the frame information CI, and may generate shift information SI of the image including the determined shift direction and the shift amount of the image. For example, the shift determiner 214 may determine an X-axis shift direction, a Y-axis shift direction, an X-axis shift amount, and a Y-axis shift amount of the image in correspondence with the number of inputs of the frame. For convenience of description in the present disclosure, the terms X-axis and Y-axis are used, but one or more embodiments are not limited to the terms, and the X-axis and Y-axis may be understood as relative directions crossing each other.

According to one or more embodiments, the shift determiner 214 may determine the shift direction and the shift amount of the image using a lookup table including the shift direction and the shift amount of the image set in correspondence with the number of inputs of the frame.

The area determiner 216 may determine a second area in which the second image is displayed in correspondence with the shift direction and the shift amount of the image included in the shift information SI of the image, and may generate an area information AI for the second area.

For example, when an X-axis shift direction, an X-axis shift amount, a Y-axis shift direction, and a Y-axis shift amount are included in the shift information SI of the image, the area determiner 216 may determine the second area shifted along the X-axis and the Y-axis directions from the first area based on the X-axis shift direction, the X-axis shift amount, the Y-axis shift direction, and the Y-axis shift amount.

The area determiner 216 may further determine the second area by reducing or enlarging the first area. For example, the second area may include an area that is less than or greater than (or same as) the first area, and at least a portion of each of the first area and the second area may overlap each other.

In one or more embodiments, the area determiner 216 may differently determine the size of the area of the second area for each frame. For example, when the first image data DATA1 of a first frame is provided to the image corrector 210, the area determiner 216 may determine the second area corresponding to the first area, and when the first image data DATA1 of a second frame is provided to the image corrector 210, the area determiner 216 may determine the second area corresponding to the second area of a size different from that of the first area.

The image corrector 210 according to one or more embodiments of the present disclosure may shift an image that is fixedly displayed in a specific area by adjusting the size of the image displayed for each frame, thereby effectively preventing or reducing afterimage occurrence in the specific area.

When the shift information SI of the image includes information in which the image is not shifted, the area determiner 216 may generate the area information AI for the first area without determining the second area.

The image data generator 218 may generate the second image data DATA2 based on the first image data DATA1 using the area information AI such that the first image displayed in the first area is shifted to the second area and is displayed as the second image.

According to one or more embodiments, the image data generator 218 may generate the second image data DATA2 of a pixel line unit based on the first image data DATA1. For example, the image corrector 210 may store the first image data DATA1 provided from the processor 100 in a line memory, and the image data generator 218 may read the first image data DATA1 from the line memory to generate the second image data DATA2 of the pixel line unit.

When the area information AI includes information on the first area, the image data generator 218 may not separately generate the second image data DATA2, and may provide the first image data DATA1 to the timing controller 220.

The timing controller 220 may receive the control signal CS and the first image data DATA1 and/or the second image data DATA2 from the image corrector 210, and may generate a scan control signal SCS and a data control signal DCS using the control signal CS.

The data driver 230 may generate a data signal DS using the first image data DATA1 and/or the second image data DATA2 provided from the timing controller 220 and the data control signal DCS. The data driver 230 may provide the data signal DS to the pixels through data lines.

The scan driver 240 may generate a scan signal SS using the scan control signal SCS. The scan driver 240 may provide the scan signal SS to the pixels through scan lines.

The display panel 250 may include the pixels, and may be implemented as an organic light emitting display panel, a liquid crystal display panel, or a plasma display panel, but is not limited thereto.

When the scan signal SS is supplied to the scan lines, each of the pixels of a pixel row selected in a horizontal unit may receive the data signal DS from the data line, and may emit light of a luminance (e.g., a set or predetermined luminance) in correspondence with the data signal DS.

Figure 3:
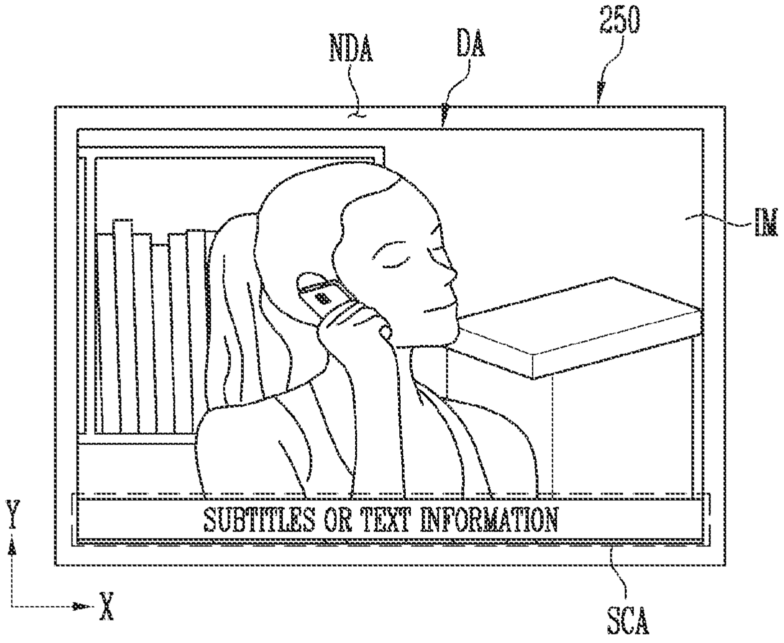
FIG. 3 is a conceptual diagram illustrating a display area of a display panel according to one or more embodiments of the present disclosure.
Figure 4:
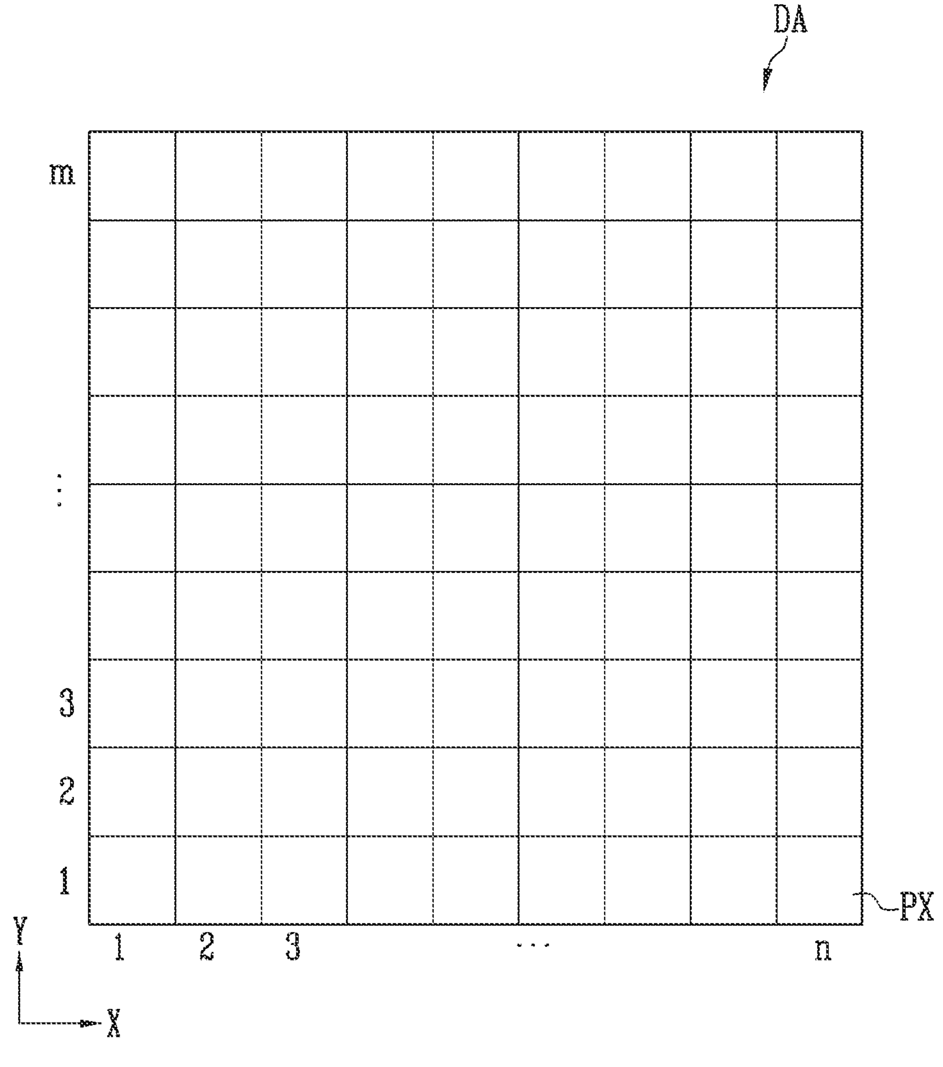
FIG. 4 is a conceptual diagram illustrating pixels disposed in the display area shown in FIG. 3.

FIG. 3 is a conceptual diagram illustrating a display area of the display panel according to one or more embodiments of the present disclosure. FIG. 4 is a conceptual diagram illustrating pixels disposed in the display area shown in FIG. 3.

Referring to FIGS. 3 and 4, the display panel 250 may include a display area DA capable of displaying an image IM. A user of the display panel 250 may visually recognize the image IM displayed on the display area DA.

The display area DA may include pixels PX arranged in an n×m matrix structure along the X-axis and the Y-axis. Each of n and m is a natural number. For example, when a resolution of the display panel 250 is 1920×1080, n may be 1920 and m may be 1080.

Each of the pixels may receive the data signal DS generated based on the first image data DATA1 and/or the second image data DATA2 to emit light at a constant or substantially constant luminance.

The display area DA may include a plurality of pixels PXs emitting light at the luminance corresponding to the data signal DS.

For example, the display area DA may have a quadrangular shape extending along the X-axis direction and the Y-axis direction.

In one or more embodiments, some images IM may include a scroll area SCA in which a subtitle, text information, or the like, shifts at a high speed in at least some sections. For example, the scroll area SCA may be positioned adjacent to one side of the display area DA. In some embodiments, the scroll area SCA may extend along one side of the display area to be adjacent to some edges of the display area DA. The scroll area SCA may be defined as an area in which a change of a grayscale value per hour is sensed at a specific value (e.g., a set or predetermined specific value) or more.

Figure 5:
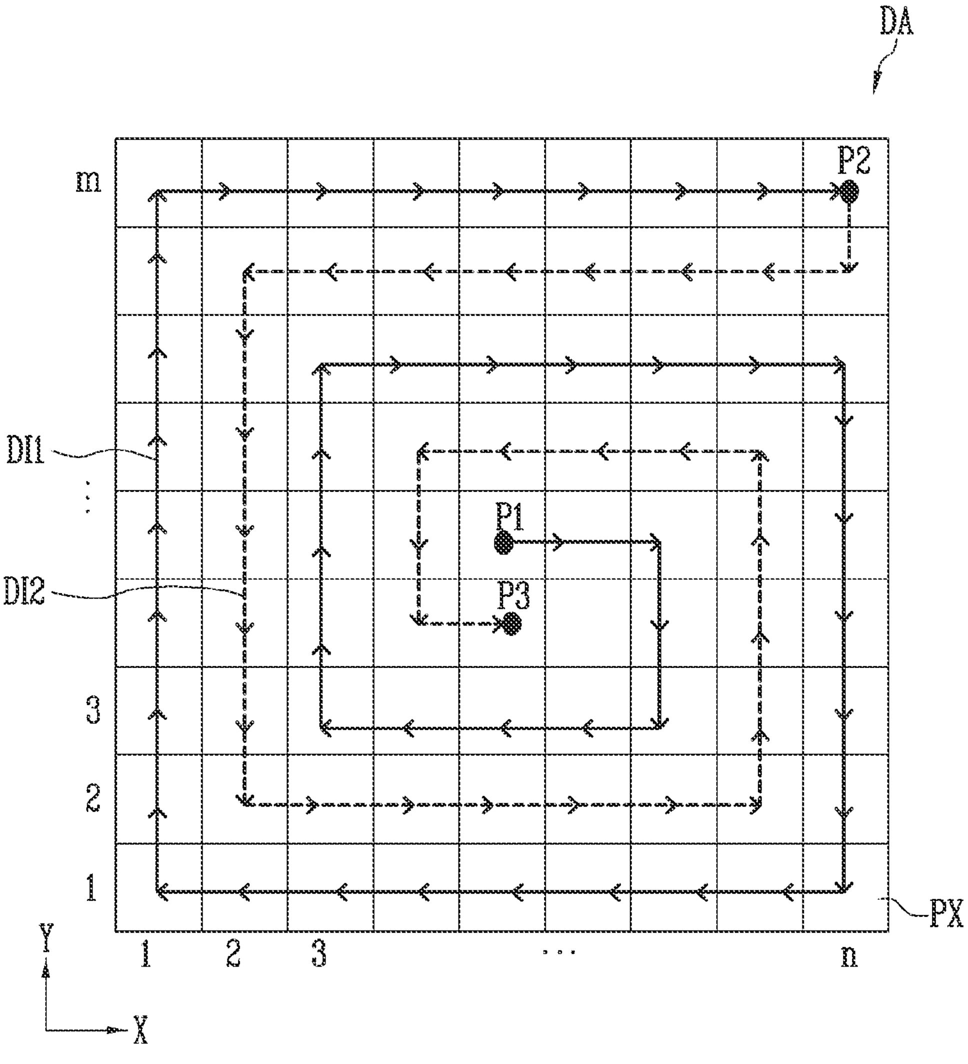
FIG. 5 is a conceptual diagram illustrating shift of an image in the display area shown in FIG. 4.

FIG. 5 is a conceptual diagram illustrating shift of the image in the display area shown in FIG. 4.

In FIG. 5, description of the shift of the image in the display area will be described based on image shift in first pixel shift driving, which will be described later.

FIG. 5 shows a shift path of a current frame image formed in the display area DA. For example, the shift path of the current frame image may include a first path DI1 starting at a first point P1 and extending to a second point P2, and a second path DI2 starting at the second point P2 and extending to a third point P3.

In one or more embodiments, the first point P1 and the third point P3 may be positioned in a center area of the display area DA, and the second point P2 may be positioned in an outer area (e.g., an area along the edge or corner) of the display area DA. In one or more embodiments, the first path DI1 and the second path DI2 may not overlap each other, and each of the first path DI1 and the second path DI2 may be formed in a maze shape surrounding each other.

The image corrector 210 may correct the first image data DATA1 to the second image data DATA2 such that the current frame image may be shifted along the first path DI1 and the second path DI2, using the shift information SI of the image provided from the shift determiner 214.

For example, the display unit 200 may display the current frame image shifted along an arrow direction (e.g., along the first path DI1 and/or the second path DI2) whenever the second image data DATA2 is provided from the processor 100.

For example, when it is assumed that a center of the current frame image is displayed at the first point P1, the display unit 200 may shift the center of the current frame image to the second point P2 along the first path DI1 and display the center of the current frame image whenever the second image data DATA2 is provided. In one or more embodiments, when the center of the current frame image is shifted to the second point P2, the display unit 200 may shift the center of the current frame image to the third point P3 along the second path DI2 and display the center of the current frame image. As described above, whenever the display unit 200 receives the second image data DATA2, the display unit 200 may shift the current frame image along the first path DI1 and the second path DI2 and display the current frame image.

In one or more embodiments, the current frame image may be shifted from the first point P1 to the second point P2 along a path which is different from the first path P1.

For example, when deterioration of the pixels PX disposed in the center area of the display area DA is severe, the current frame image may be shifted from the first point P1 to the second point P2 along a path which is shorter than the first path P1. In such a case, the center of the current frame image may shift to the outer area of the display area DA faster. Accordingly, stress of the pixels PX disposed in the central area may be more quickly distributed to the pixels PX disposed in the outer area.

Therefore, the shift determiner 214 may determine a degree of deterioration of the pixels PX, and as the degree of deterioration becomes more severe (e.g., increase), a shift path including a large number of paths may be determined as a shift path of the current frame image.

The shift path of the current frame of the image described above may be merely an example, and various shift paths may be applied.

Figure 6:
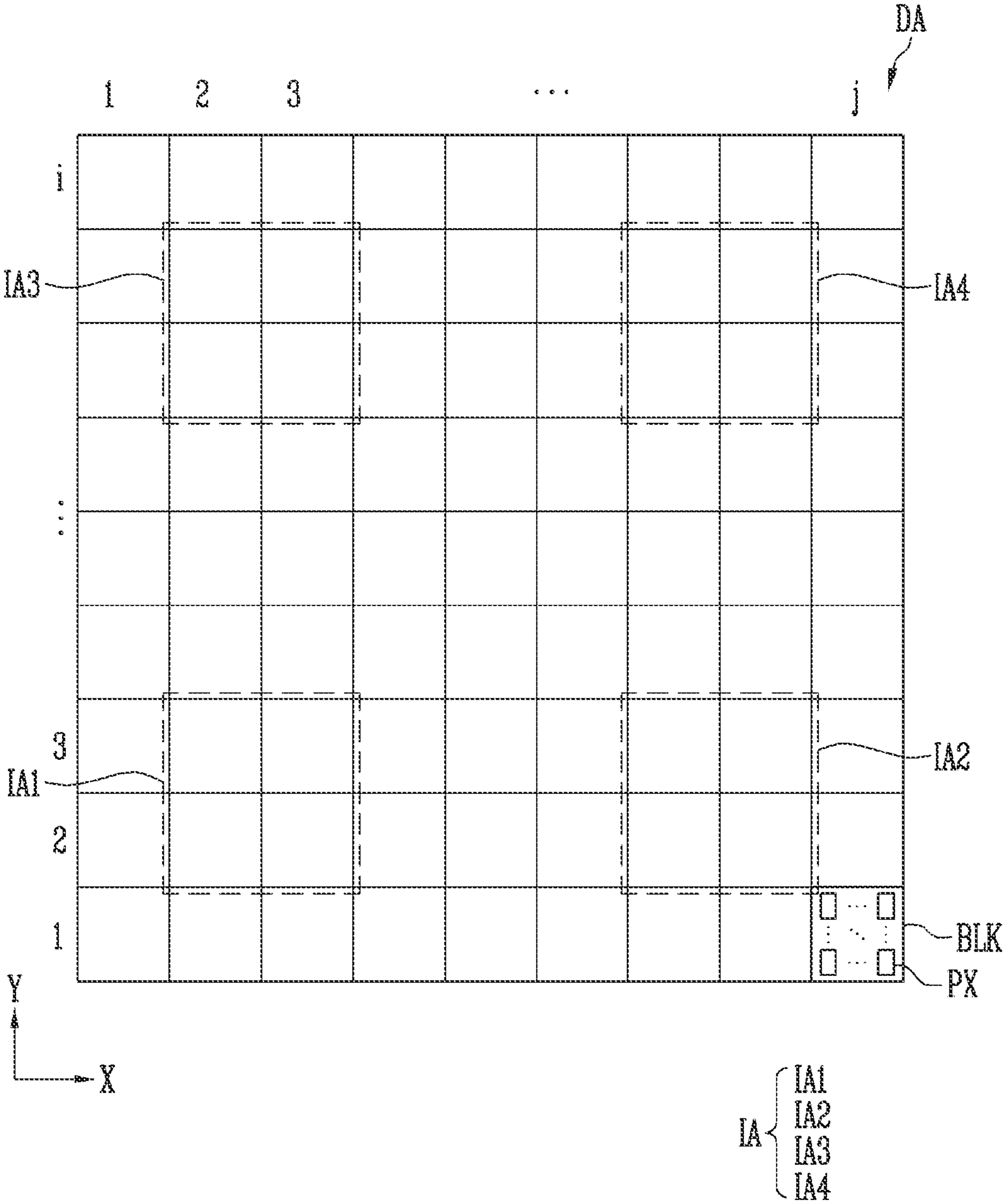
FIG. 6 is a conceptual diagram illustrating pixel blocks in the display area shown in FIG. 4.

FIG. 6 is a conceptual diagram illustrating pixel blocks in the display area shown in FIG. 4.

Referring to FIG. 6, each of the pixel blocks BLK in the display area DA includes a plurality of pixels PX. The display area DA may include the pixel blocks BLK arranged in a j×i matrix structure along the X-axis and the Y-axis. For example, j is less than n and i is less than m. For example, the pixel blocks BLK may be a (12 to 20)×(14 to 22) matrix structure.

The pixel blocks BLK may be set to include a number (e.g., a set or predetermined number) of pixels PX. The pixels PX included in each pixel block BLK may be arranged in a matrix form.

The display device 10 may sense a sum of grayscale values or a sum of luminance values of the pixels PX included in each pixel block BLK. According to one or more embodiments of the present disclosure, the sum of the grayscale values or the sum of the luminance values of the pixels PX included in each pixel block BLK may be referred to as a block grayscale value.

The display device 10 may sense the block grayscale value through measurement of a current or a voltage flowing through the pixel included in each pixel block BLK. In one or more embodiments, the display device 10 may measure a change rate per hour of the block grayscale value.

One interest area IA including at least one pixel block BLK may be set in the display area DA. For example, the pixel blocks BLK included in the interest area IA may be arranged in a matrix form.

In one or more embodiments, the interest area IA may be positioned in an area adjacent to each edge of the display area DA. The present embodiment illustrates that first to fourth interest areas IA1 to IA4 positioned adjacent to four corners of the display area DA are set in the display area DA.

Some of the interest area IA is set to include at least a portion of the scroll area SCA. For example, some of the interest areas IA (e.g., the first interest area IA1 and the second interest area IA2) may overlap a position at (or a section of) the display area DA where the scroll area (e.g., indicated by SCA in FIG. 3) is formed in which the image (e.g., indicated by IM in FIG. 3) is displayed. For example, the first interest area IA1 and the second interest area IA2, positioned at a lower side (or adjacent to a lower edge) of the display area DA, may overlap the position at (or section of) the display area DA where the scroll area SCA is formed.

Figure 7:
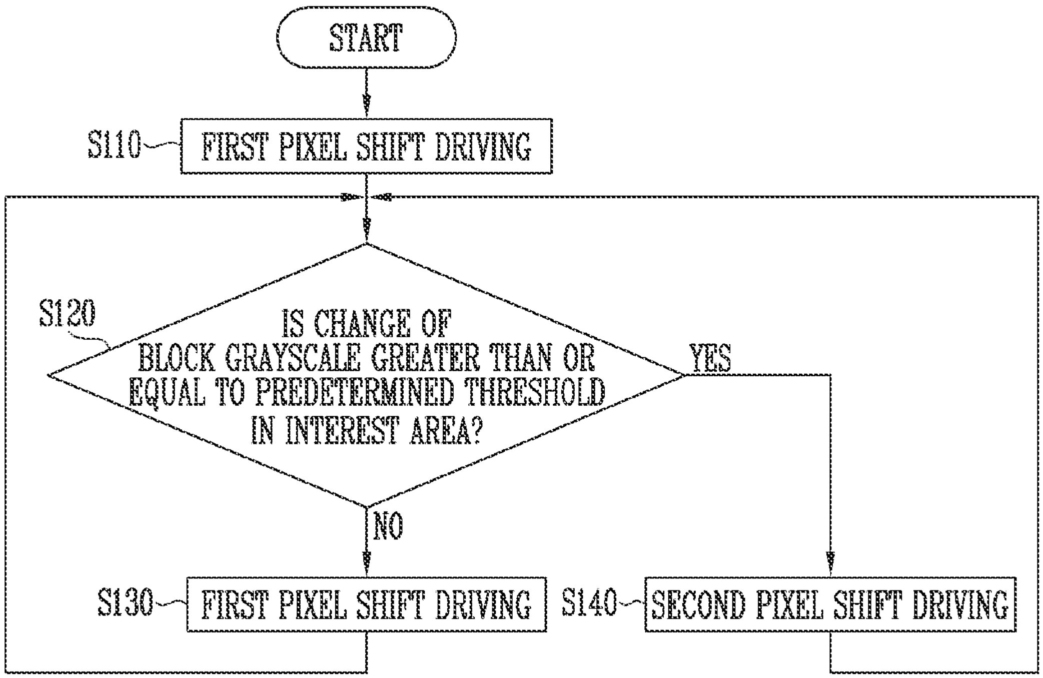
FIG. 7 is an algorithm flowchart schematically illustrating a method of driving the display device according to one or more embodiments of the present disclosure.
Figure 8:
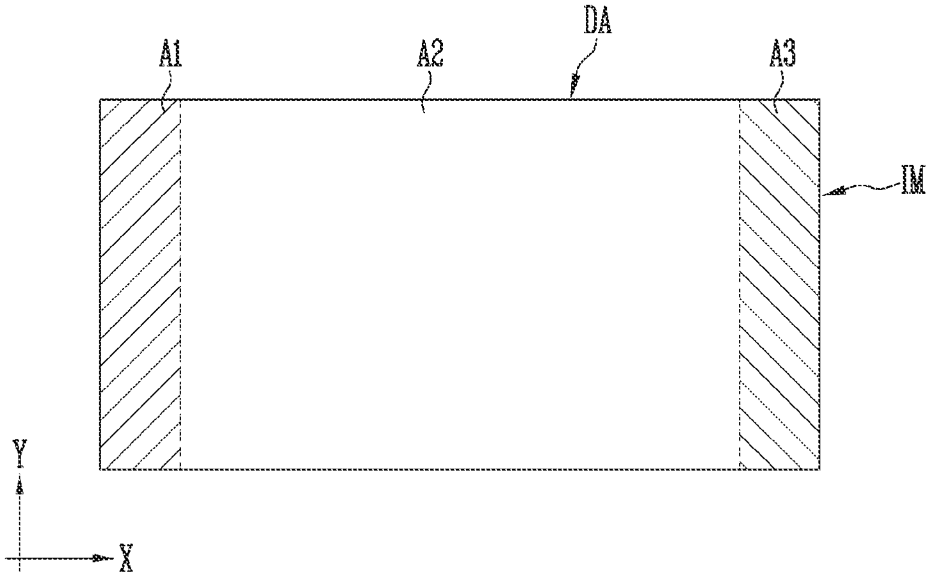
FIGS. 8 and 9 are conceptual diagrams illustrating an X-axis direction image shift according to one or more embodiments of the present disclosure.
Figure 9:
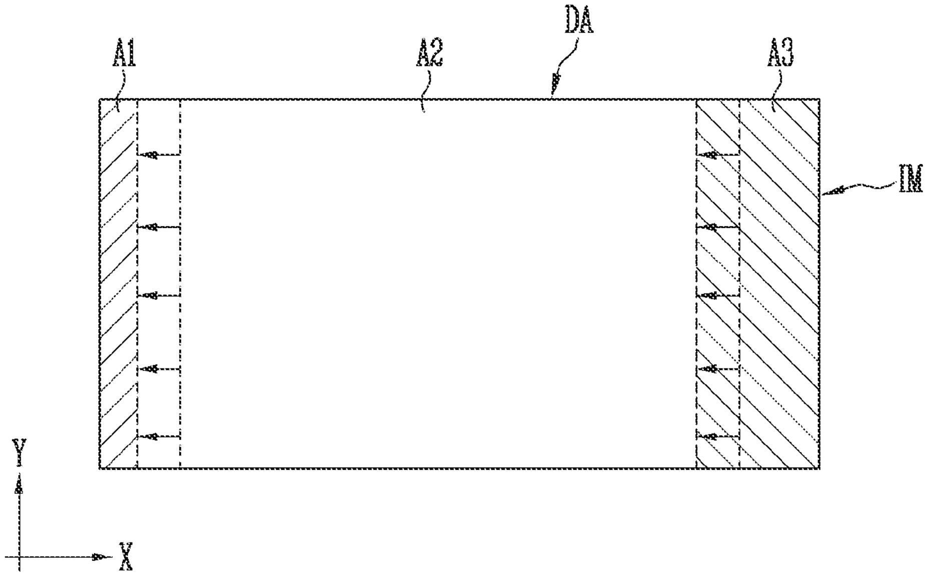
Figure 10:
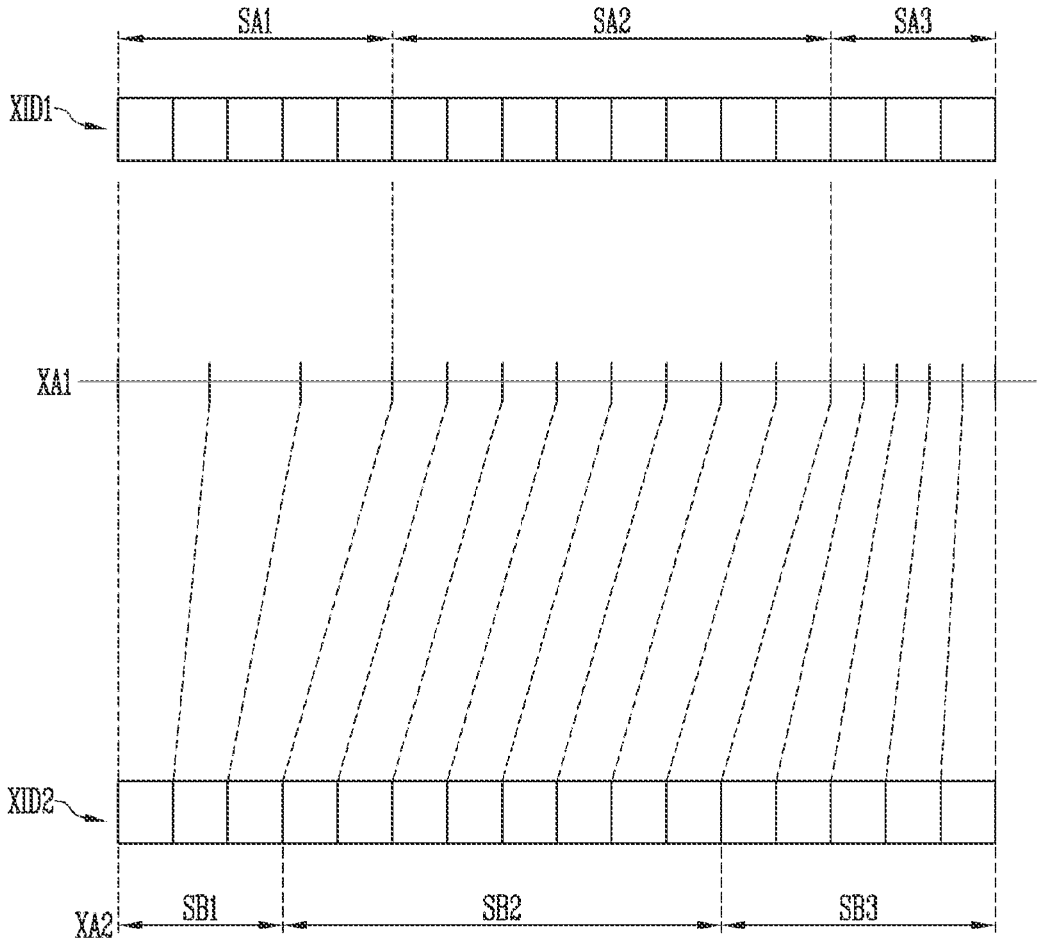
FIG. 10 is a conceptual diagram illustrating a method of generating image data shifted in an X-axis direction according to one or more embodiments of the present disclosure.
Figure 11:
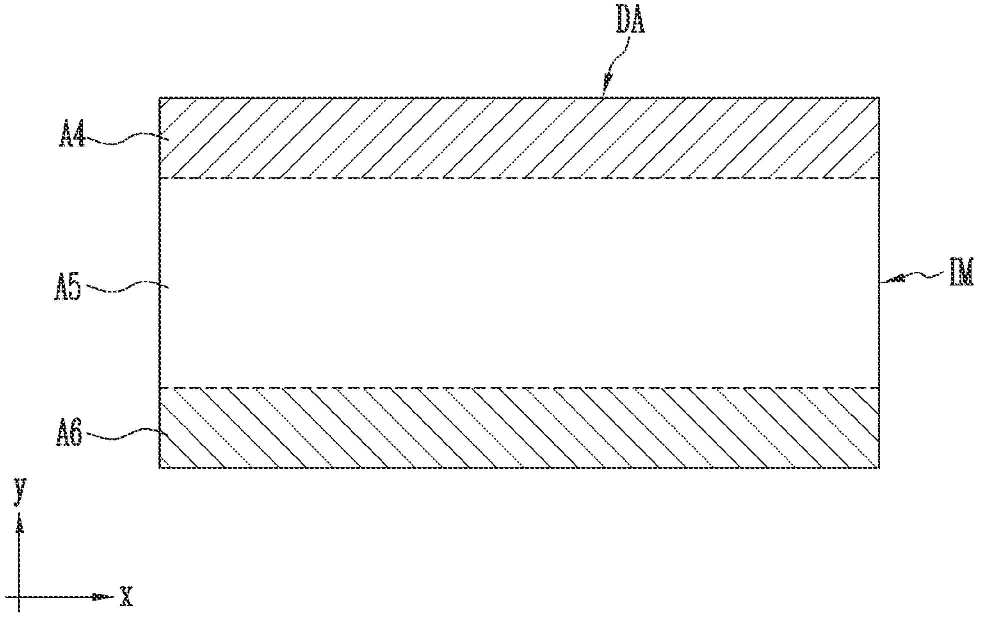
FIGS. 11 and 12 are conceptual diagrams illustrating a Y-axis direction image shift according to one or more embodiments of the present disclosure.
Figure 12:
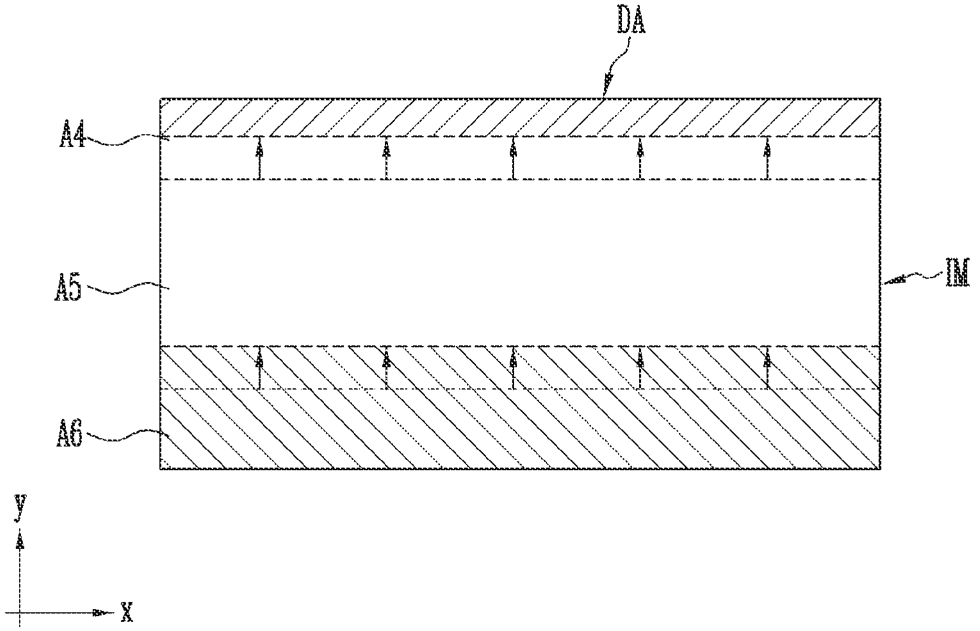
Figure 13:
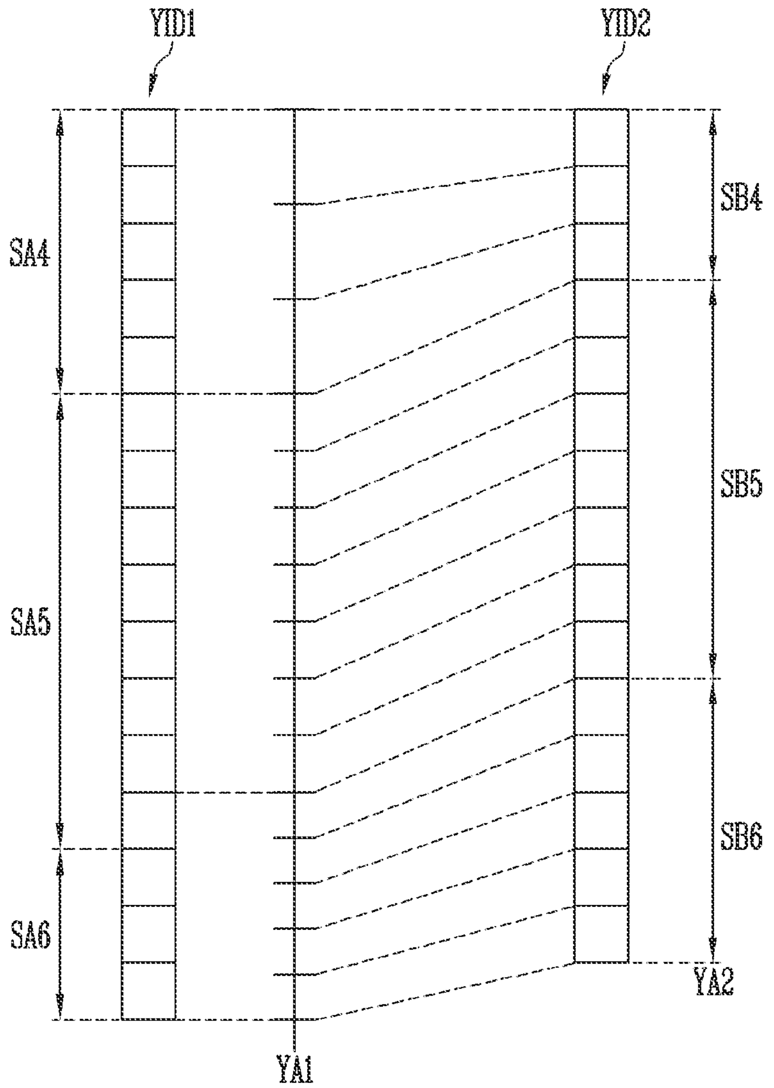
FIG. 13 is a conceptual diagram illustrating a method of generating image data shifted in a Y-axis direction according to one or more embodiments of the present disclosure.
Figure 14:
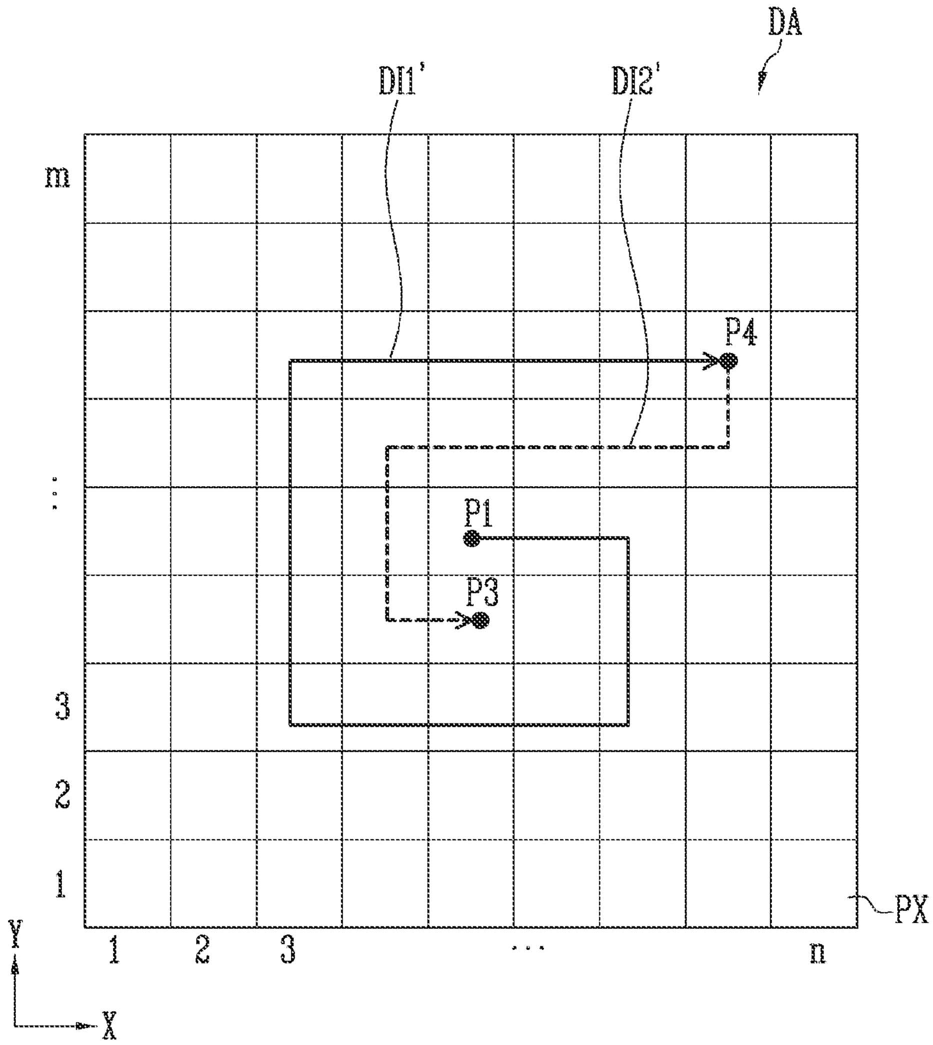
FIG. 14 is a conceptual diagram illustrating shift of the image in the display area shown in FIG. 4.
Figure 15:
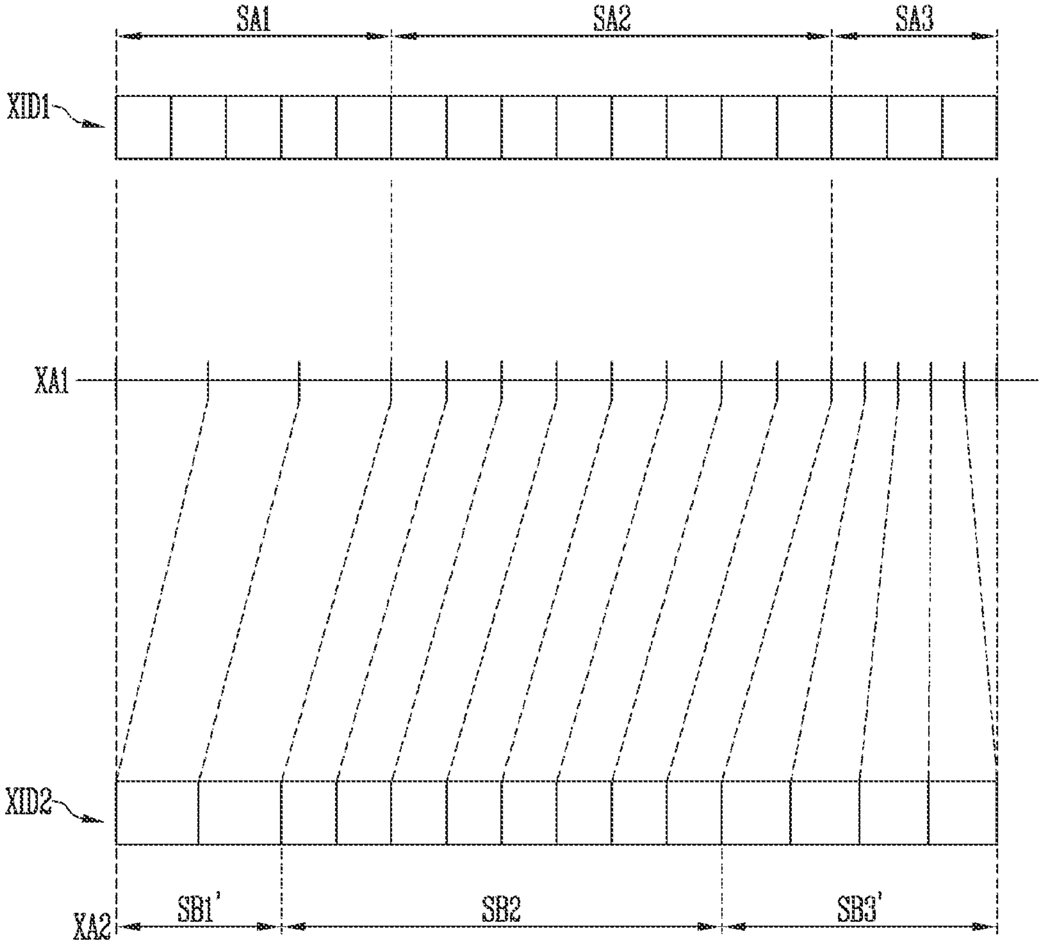
FIG. 15 is a conceptual diagram illustrating a method of generating the image data shifted in the X-axis direction according to one or more embodiments.

FIG. 7 is an algorithm flowchart schematically illustrating a method of driving the display device according to one or more embodiments of the present disclosure. FIGS. 8 and 9 are conceptual diagrams illustrating an X-axis direction image shift according to one or more embodiments of the present disclosure. FIG. 10 is a conceptual diagram illustrating a method of generating an image data shifted in an X-axis direction according to one or more embodiments. FIGS. 11 and 12 are conceptual diagrams illustrating a Y-axis direction image shift according to one or more embodiments. FIG. 13 is a conceptual diagram illustrating a method of generating image data shifted in a Y-axis direction according to one or more embodiments. FIG. 14 is a conceptual diagram illustrating shift of the image in the display area shown in FIG. 4. FIG. 15 is a conceptual diagram illustrating a method of generating the image data shifted in the X-axis direction according to one or more embodiments.

FIGS. 8-13 are shown based on the first pixel shift driving, which will be described later, and FIGS. 14 and 15 are shown based on a second pixel shift driving, which will be described later.

Referring to FIG. 7, the method driving the display device 10 includes first pixel shift driving (S110), checking whether a change of a block grayscale value in the interest area IA is greater than or equal to a threshold (e.g., a set or predetermined threshold) (S120); and first pixel shift driving (S130), and second pixel shift driving (S140). In the present disclosure, although each step is described as being sequentially performed according to the flowchart, it is apparent that some steps shown as being performed continuously may be concurrently performed (e.g., simultaneously performed), the order of each step may be changed, some steps may be omitted, or another step may be further included between each step unless the spirit of the disclosure is changed.

First, the first pixel shift driving S110 may be performed on the display device 10.

In one or more embodiments of the present disclosure, the first pixel shift driving corresponds to a driving in which an image shift of a maximum range (e.g., a first range) is performed and there is no image information loss due to enlargement of the image and/or reduction of the image. For example, in the first pixel shift driving, an image shift of a maximum range (e.g., a first range) is performed without loss of image information due to enlargement of the image and/or reduction of the image.

In one or more embodiments of the present disclosure, the second pixel shift driving corresponds to a driving in which the image information loss occurs in at least some areas due to the enlargement of the image and/or the reduction of the image. The second pixel shift driving may be a driving in which the image shift of a range (e.g., a second range) less than that of the first pixel shift driving is performed, and the image information loss occurs in at least some areas due to the enlargement of the image and/or the reduction of the image, or the image information loss occurs without enlargement of the image and/or reduction of the image.

Hereinafter, the first pixel shift driving will be described with reference to FIGS. 8-13. Description will be given based on the image shift in the X-axis direction and the Y-axis direction.

Referring to FIGS. 8 and 9, the display device 10 may display the image IM on the display area DA during several frame periods. Here, the size of the image IM may be set to be less than or equal to the display area DA.

The image IM may include a plurality of areas. For example, the image IM may include a first area A1, a second area A2, and a third area A3. The first area A1, the second area A2, and the third area A3 may be sequentially arranged along the X-axis direction X. In other words, when determining the order along the X-axis direction X, the second area A2 may be an area disposed between the first area A1 and the third area A3. In a viewpoint of FIGS. 8 and 9, the first area A1 may be an area disposed on a left side of the second area A2, and the third area A3 may be an area disposed on a right side of the second area A2.

Here, the X-axis direction X may refer to a direction indicated by a straight line extending in one direction in the display area DA, and may also refer to a direction substantially orthogonal to the Y-axis direction Y. In the viewpoint of FIGS. 8 and 9, the X-axis direction X may be defined in a direction indicated by an arbitrary straight line extending from left to right. In some embodiments, the X-axis direction X may also be defined as a direction in which a column of each pixel disposed in the display area DA increases. Accordingly, in the viewpoint of FIGS. 8 and 9, the Y-axis direction Y may be defined in a direction indicated by an arbitrary straight line extending from an upper side to a lower side. In some embodiments, the Y-axis direction Y may also be defined as a direction in which a row of each pixel disposed in the display area DA increases.

FIG. 8 schematically shows the image IM displayed on the display area DA during a first frame period, and FIG. 9 schematically shows the image IM displayed on the display area DA during a second frame period.

Here, the first frame period may refer to a period in which at least one frame is displayed, and the second frame is displayed in succession to the first frame period and may refer to a period in which at least one frame is displayed.

The image IM displayed during the first frame period may be displayed in a form shifted in a direction opposite to the X-axis direction X in the second frame period. In other words, the first area A1, the third area A3, and the second area A2 of the image IM displayed during the first frame period may be displayed in a form in which some areas are modified in the second frame period.

For example, the first area A1 may be reduced in the direction opposite to the X-axis direction X in the second frame period compared to the first frame period, and the third area A3 may be enlarged in the direction opposite to the X-axis direction X in the second frame period compared to the first frame period. The second area A2 may be shifted in the direction opposite to the X-axis direction X in the second frame period compared to the first frame period. However, the entire area of the first area A1, the third area A3, and the second area A2 may remain substantially identical in the first frame period and the second frame period.

As described above, afterimage occurrence may be suppressed and deterioration of the display device 10 may be minimized or reduced, by enlarging, reducing, and shifting the image IM for each area.

The embodiment of FIGS. 8 and 9 illustrates the shift in the direction opposite to the X-axis direction X, but the shift in the X-axis direction X may be possible. In such a case, the first area A1 may be enlarged in the X-axis direction X, the third area A3 may be reduced in the X-axis direction X, and the second area A2 may be shifted in the X-axis direction X.

In one or more embodiments of the present disclosure, the area in which the area is enlarged or reduced by the shift of the image, such as the first area A1 and the third area A3, will be referred to as an edge scaling area. A fourth area A4 and a sixth area A6, which will be described later, also correspond to the edge scaling area.

Referring to FIG. 10, in FIG. 10, for convenience of description, first X-axis image data XID1 and second X-axis image data XID2 associated with a pixel of one row from among the pixels PX (e.g., see FIG. 4) arranged in a matrix form are shown. Here, the first X-axis image data XID1 may correspond to a portion of first image data ID1, and the second X-axis image data XID2 may correspond to a portion of second image data ID2.

The area determiner 216 may divide the image IM into shift before sub areas SA1, SA2, and SA3 along the X-axis direction X. Here, a before shift X-axis area XA1 may include the shift before sub areas SA1, SA2, and SA3.

In one or more embodiments, a shift after X-axis area XA2 may include shift after sub areas SB1, SB2, and SB3 corresponding to data for after the image IM shifts.

For example, the area determiner 216 may determine an image displayed from the leftmost pixel to a fifth pixel from the leftmost pixel in a right direction as a shift before first area SA1, may determine an image displayed from the rightmost pixel to a third pixel from the rightmost pixel in a left direction as a shift before third area SA3, and may determine a shift before second area SA2 positioned between the shift before first area SA1 and the shift before third area SA3.

The image data generator 218 may convert the first X-axis image data XID1 into the second X-axis image data XID2 such that the first X-axis image data XID1, which displays the shift before sub areas SA1, SA2, and SA3, displays the shift after sub areas SB1, SB2, and SB3.

For example, the image data generator 218 may convert the first X-axis image data XID1 into the second X-axis image data XID2 such that the first X-axis image data XID1, which displays the shift before first area SA1, displays the shift after first area SB1.

In one or more embodiments, the image data generator 218 may convert the first X-axis image data XID1 into the second X-axis image data XID2 such that the first X-axis image data XID1, which displays the shift before third area SA3, displays the shift after third area SB3.

In one or more embodiments, the image data generator 218 may convert the first X-axis image data XID1 into the second X-axis image data XID2 such that the first X-axis image data XID1, which displays the shift before second area SA2, displays the shift after second area SB2.

Hereinafter, the reduction of the image will be described in more detail.

The area determiner 216 may determine the shift after first area SB1 being reduced compared to the shift before first area SA1, using the shift information SI of the image including the shift direction and the shift amount generated by the shift determiner 214.

For example, when the shift direction is set to the direction opposite to the X-axis direction X, and the image shift amount is set to n (n is a natural number) pixel shift, the area determiner 216 may set the shift after first area SB1 being reduced with respect to the shift before first area SA1 by n pixels in the direction opposite to the X-axis direction X.

Thereafter, in order to reduce the image, the image data generator 218 may convert an image displayed on p (p is a natural number) pixels PX of the shift before first area SA1 into an image displayed on q (q is a natural number less than p) pixels PX of the shift after first area SB1.

For example, the image data generator 218 may convert data to be provided to the p pixels PX into data to be provided to the q pixels PX.

Because the image displayed on the p pixels PX is displayed on the q pixels PX, the image displayed in the shift after first area SB1 may be reduced at a ratio of k with respect to the image displayed in the shift before first area SA1, and may be displayed (here, k=q/p) accordingly.

Hereinafter, the enlargement of the image will be described in more detail.

The area determiner 216 may determine the shift after third area SB3 enlarged compared to the shift before third area SA3, using the shift information SI of the image including the shift direction and the shift amount generated by the shift determiner 214.

For example, when the shift direction is set to the direction opposite to the X-axis direction X, and the image shift amount is set to n (n is a natural number) pixel shift, the area determiner 216 may set the shift after third area SB3 being enlarged compared to the shift before third area SA3 by n pixels in the direction opposite to the X-axis direction X.

Thereafter, in order to enlarge the image, the image data generator 218 may convert an image displayed on r (r is a natural number) pixels PX of the shift before third area SA3 into an image displayed on s (s is a natural number greater than r) pixels PX of the shift after third area SB3.

For example, the image data generator 218 may convert data to be provided to the r pixels PX into data to be provided to the s pixels PX.

Because the image displayed on the r pixels PX is displayed on the s pixels PX, the image displayed in the shift after third area SB3 may be enlarged at a ratio of I with respect to the image displayed in the shift before third area SA3, and may be displayed (here, I=s/r).

Hereinafter, the shift of the image will be described in more detail.

The area determiner 216 may determine the shift after second area SB2 shifted from the shift before second area SA2, using the shift information SI of the image including the shift direction and the shift amount generated by the shift determiner 214.

For example, when the shift direction is set to the direction opposite to the X-axis direction X, and the image shift amount is set to n (n is a natural number) pixel shift, the area determiner 216 may set the shift after second area SB2 being shifted from the shift before second area SA2 by n pixels in the direction opposite to the X-axis direction X.

Thereafter, in order to shift the image, the image data generator 218 may convert an image displayed on t (t is a natural number) pixels PX of the shift before second area SA2 into an image displayed on t pixels PX of the shift after second area SB2 to convert a position thereof.

Referring to FIGS. 11 and 12, the display device 10 may display the image IM on the display area DA during several frame periods. Here, the size of the image IM may be set to be less than or equal to the display area DA.

The image IM may include a plurality of areas. For example, the image IM may include a fourth area A4, a fifth area A5, and a sixth area A6. The fourth area A4, the fifth area A5, and the sixth area A6 may be sequentially arranged along the Y-axis direction Y. In other words, when determining the order along the Y-axis direction Y, the fifth area A5 may be an area disposed between the fourth area A4 and the sixth area A6. In a viewpoint of FIGS. 11 and 12, the fourth area A4 may be an area disposed above the fifth area A5, and the sixth area A6 may be an area disposed below the fifth area A5.

FIG. 11 schematically shows the image IM displayed on the display area DA during a third frame period, and FIG. 12 schematically shows the image IM displayed on the display area DA during a fourth frame period.

Here, the third frame period may mean a period in which at least one frame is displayed, and the fourth frame is displayed in succession to the third frame period and may mean a period in which at least one frame is displayed.

The image IM displayed during the third frame period may be displayed in a form shifted in the Y-axis direction Y in the fourth frame period. In other words, the fourth area A4, the fifth area A5, and the sixth area A6 of the image IM displayed during the third frame period may be displayed in a form in which some areas are modified in the fourth frame period.

For example, the fourth area A4 may be reduced in the Y-axis direction Y in the fourth frame period compared to the third frame period, and the sixth area A6 may be enlarged in the Y-axis direction Y in the fourth frame period compared to the third frame period. The fifth area A5 may be shifted in the Y-axis direction Y in the fourth frame period compared to the third frame period. However, the entire area of the fourth area A4, the fifth area A5, and the sixth area A6 may remain substantially identical in the third frame period and the fourth frame period.

As described above, afterimage occurrence may be suppressed and deterioration of the display device 10 (or the pixels PX) may be minimized or reduced, by enlarging, reducing, and shift the image IM for each area.

The embodiment of FIGS. 11 and 12 illustrates the shift in the Y-axis direction Y, but the shift in a direction opposite to the Y-axis direction Y may be possible. In such a case, the fourth area A4 may be enlarged in the direction opposite to the Y-axis direction Y, the sixth area A6 may be reduced in the direction opposite to the Y-axis direction Y, and the fifth area A5 may be shifted in the direction opposite to the Y-axis direction Y.

In FIG. 13, for convenience of description, first Y-axis image data YID1 and second Y-axis image data YID2 associated with a pixel of one column from among the pixels PX (e.g., see FIG. 4) arranged in a matrix form are shown. Here, the first Y-axis image data YID1 may correspond to a portion of the first image data ID1, and the second Y-axis image data YID2 may correspond to a portion of the second image data ID2.

The area determiner 216 may divide the image IM into shift before sub areas SA4, SA5, and SA6 along the Y-axis direction Y. Here, a before shift Y-axis area YA1 may include the shift before sub areas SA4, SA5, and SA6.

In one or more embodiments, a shift after Y-axis area XA2 may include shift after sub areas SB4, SB5, and SB6 corresponding to data for after the image IM shifts.

For example, the area determiner 216 may determine an image displayed from the uppermost pixel to a fifth pixel from the uppermost pixel in a lower direction as a shift before fourth area SA4, may determine an image displayed from the lowermost pixel to a third pixel from the lowermost pixel in an upper direction as a shift before sixth area SA6, and may determine a shift before fifth area SA5 positioned between the shift before fourth area SA4 and the shift before sixth area SA6.

The image data generator 218 may convert the first Y-axis image data YID1 into the second Y-axis image data YID2 such that the first Y-axis image data YID1, which displays the shift before sub areas SA4, SA5, and SA6, displays the shift after sub areas SB4, SB5, and SB6.

For example, the image data generator 218 may convert the first Y-axis image data YID1 into the second Y-axis image data YID2 such that the first Y-axis image data YID1, which displays the shift before fourth area SA4, displays the shift after fourth area SB4.

In one or more embodiments, the image data generator 218 may convert the first Y-axis image data YID1 into the second Y-axis image data YID2 such that the first Y-axis image data YID1, which displays the shift before sixth area SA6, displays the shift after sixth area SB6.

In one or more embodiments, the image data generator 218 may convert the first Y-axis image data YID1 into the second Y-axis image data YID2 such that the first Y-axis image data YID1, which displays the shift before fifth area SA5, displays the shift after fifth area SB5.

Hereinafter, the reduction of the image will be described in more detail.

The area determiner 216 may determine the shift after fourth area SB4 being reduced compared to the shift before fourth area SA4, using the shift information SI of the image including the shift direction and the shift amount generated by the shift determiner 214.

For example, when the shift direction is set to the Y-axis direction Y, and the image shift amount is set to n (n is a natural number) pixel shift, the area determiner 216 may set the shift after fourth area SB4 being reduced with respect to the shift before fourth area SA4 by n pixels in the Y-axis direction Y.

Thereafter, in order to reduce the image, the image data generator 218 may convert an image displayed on p (p is a natural number) pixels PX of the shift before fourth area SA4 into an image displayed on q (q is a natural number less than p) pixels PX of the shift after fourth area SB4.

For example, the image data generator 218 may convert data to be provided to the p pixels PX into data to be provided to the q pixels PX.

Because the image displayed on the p pixels PX is displayed on the q pixels PX, the image displayed in the shift after fourth area SB4 may be reduced at a ratio of k with respect to the image displayed in the shift before fourth area SA4, and may be displayed (here, k=q/p) accordingly.

Hereinafter, the enlargement of the image will be described in more details.

The area determiner 216 may determine the shift after sixth area SB6 enlarged compared to the shift before sixth area SA6, using the shift information SI of the image including the shift direction and the shift amount generated by the shift determiner 214.

For example, when the shift direction is set to the Y-axis direction Y, and the image shift amount is set to n (n is a natural number) pixel shift, the area determiner 216 may set the shift after sixth area SB6 being enlarged with respect to the shift before sixth area SA6 by n pixels in the Y-axis direction Y.

Thereafter, in order to enlarge the image, the image data generator 218 may convert an image displayed on r (r is a natural number) pixels PX of the shift before sixth area SA6 into an image displayed on s (s is a natural number greater than s) pixels PX of the shift after sixth area SB6.

For example, the image data generator 218 may convert data to be provided to the r pixels PX into data to be provided to the s pixels PX.

Because the image displayed on the r pixels PX is displayed on the s pixels PX, the image displayed in the shift after sixth area SB6 may be enlarged at a ratio of I with respect to the image displayed in the shift before sixth area SA6, and may be displayed (here, I=s/r) accordingly.

Hereinafter, the shift of the image will be described in more detail.

The area determiner 216 may determine the shift after fifth area SB5 shifted from the shift before fifth area SA5, using the shift information SI of the image including the shift direction and the shift amount generated by the shift determiner 214.

For example, when the shift direction is set to the Y-axis direction Y, and the image shift amount is set to n (n is a natural number) pixel shift, the area determiner 216 may set the shift after fifth area SB5 being shifted from the shift before fifth area SA5 by n pixels in the Y-axis direction Y.

Thereafter, in order to shift the image, the image data generator 218 may convert an image displayed on t (t is a natural number) pixels PX of the shift before fifth area SA5 into an image displayed on t pixels PX of the shift after fifth area SB5 to convert a position thereof.

In the first pixel shift driving, even though the image IM is enlarged, reduced, and shifted for each area, because all image information is displayed, image information loss may not occur.

Referring to FIG. 7 again, next, checking whether the change of the block grayscale value in the interest area IA is greater than or equal to the threshold (e.g., a set or predetermined threshold) (S120) may be performed on the display device 10.

The display device 10 may sense the change of the block grayscale value per hour (hereinafter, a block grayscale value change rate) in at least a portion of a plurality of interest areas IA, and may check whether the change rate is greater than or equal to the threshold (e.g., a set or predetermined threshold).

For example, when some images IM include the scroll area SCA, the block grayscale value change rate in at least one interest area IA may be greater than or equal to the threshold. When some images IM do not include the scroll area SCA, the block grayscale value change rate may be less than the threshold in all interest areas IA (e.g., first to fourth interest areas IA1 to IA4).

When the block grayscale value change rate is less than the threshold in all interest areas IA, the first pixel shift driving (S130) may be performed again. In the drawings, it is illustrated that each first pixel shift driving (S110 and S130) is performed based on the checking whether the change of the block grayscale value is greater than or equal to the threshold (e.g., a set or predetermined threshold) in the interest area IA (S120). However, when the block grayscale value change rate is substantially less than the threshold in all interest areas IA, the first pixel shift driving (S130), after checking whether the change of the block grayscale value is greater than or equal to the threshold (e.g., a set or predetermined threshold) in the interest area IA (S120), may be maintaining the first pixel shift driving (S130), before the checking whether the change of the block grayscale value is greater than or equal to the threshold (e.g., a set or predetermined threshold) in the interest area IA (S120).

In one or more embodiments, when the block grayscale value change rate is greater than or equal to the threshold, the second pixel shift driving (S140) may be performed.

In some embodiments, in the second pixel shift driving, the image shift of a range less than that of the first pixel shift driving may be performed.

Referring to FIG. 14, a shift path of a current frame image formed in the display area DA is shown as in FIG. 5. For example, the shift path of the current frame image may include a first path DI1' starting at a first point P1 and extending to a fourth point P4, and a second path DI2' starting at the fourth point P4 and extending to a third point P3.

Here, the first point P1 and the third point P3 may be positioned in the central area of the display area DA, and the fourth point P4 may be positioned in one area between the center and an outer edge of the display area DA. In one or more embodiments, the first path DI1' and the second path DI2' may not overlap each other, and each of the first path DI1' and the second path DI2' may be formed in a maze shape surrounding each other.

The image corrector 210 may correct the first image data DATA1 to the second image data DATA2 such that the current frame image may be shifted along the first path DI1' and the second path DI2', using the shift information SI of the image provided from the shift determiner 214.

In one or more embodiments, the display unit 200 may display the current frame image shifted along an arrow direction whenever the second image data DATA2 is provided from the processor 100.

For example, when it is assumed that a center of the current frame image is displayed at the first point P1, the display unit 200 may shift the center of the current frame image to the fourth point P4 along the first path DI1' and may display the center of the current frame image whenever the second image data DATA2 is provided. In one or more embodiments, when the center of the current frame image is shifted to the fourth point P4, the display unit 200 may shift the center of the current frame image to the third point P3 along the second path DI2' to display the center of the current frame image. As described above, whenever the display unit 200 receives the second image data DATA2, the display unit 200 may shift the current frame image along the first path DI1' and the second path DI2' and display the current frame image.

Referring to FIG. 5 along with FIG. 14, the fourth point P4 is a position close to the center area of the display area DA compared to the second point P2, and the first path DI1' and the second path DI2' in the second pixel shift driving are distances shorter than the first path DI1 and the second path DI2 in the first pixel shift driving.

In one or more embodiments, in the second pixel shift driving, the image shift may not be performed.

In the second pixel shift driving of some other embodiments, image information loss may occur in at least some areas due to enlargement of the image IM and reduction of the image IM.

Referring to FIG. 15, the reduction of the image IM and the enlargement of the image IM in the second pixel shift driving will be described.

The area determiner 216 may determine a shift after first area SB1' being reduced compared to the shift before first area SA1, using the shift information SI of the image including the shift direction and the shift amount generated by the shift determiner 214.

For example, when the shift direction is set to the direction opposite to the X-axis direction X, and the image shift amount is set to n (n is a natural number) pixel shift, the area determiner 216 may set the shift after first area SB1' being reduced with respect to the shift before first area SA1 by n pixels in the direction opposite to the X-axis direction X.

Thereafter, in order to reduce the image, the image data generator 218 may convert some of the image IM displayed on p (p is a natural number) pixels PX of the shift before first area SA1 into the image IM displayed on q (q is a natural number less than p) pixels PX of the shift after first area SB1'. In other words, in the second pixel shift driving, all the images IM displayed on the p pixels PX of the shift before first area SA1 may not be displayed on the q pixels PX.

For example, the image data generator 218 may convert some of the data to be provided to the p pixels PX into data to be provided to the q pixels PX.

Because the image displayed on the p pixels PX is displayed on the q pixels PX, only a portion of the image IM displayed in the shift after first area SB1' may be reduced compared to the image IM displayed in the shift before first area SA1 and may be displayed, and the remaining portions may not be displayed. Accordingly, the image information loss may occur in the second pixel shift driving.

Hereinafter, the enlargement of the image IM will be described in more details.

The area determiner 216 may determine a shift after third area SB3' being enlarged compared to the shift before third area SA3, using the shift information SI of the image including the shift direction and the shift amount generated by the shift determiner 214.

For example, when the shift direction is set to the direction opposite to the X-axis direction X, and the image shift amount is set to n (n is a natural number) pixel shift, the area determiner 216 may set the shift after third area SB3' being enlarged with respect to the shift before third area SA3 by n pixels in the direction opposite to the X-axis direction X.

Thereafter, in order to enlarge the image IM, the image data generator 218 may shift the image IM displayed on r (r is a natural number) pixels PX of the shift before third area SA3, and then convert some of the image IM displayed on r pixels PX of the shift before third area SA3 into the image IM displayed on s (s is a natural number greater than r) pixels PX of the shift after third area SB3'. In other words, in the second pixel shift driving, all images IM displayed on the r pixels PX of the shift before third area SA3 may not be displayed on the s pixels PX.

For example, the image data generator 218 may convert some of data to be provided to the r pixels PX into data to be provided to the s pixels PX.

Because the image IM displayed on the r pixels PX is displayed on the s pixels PX, only a portion of the image IM displayed in the shift after third area SB3' may be enlarged compared to the image IM displayed in the shift before third area SA3 and may be displayed accordingly, and the remaining portions may not be displayed. Accordingly, the image information loss may occur in the second pixel shift driving.

In the second pixel shift driving of some other embodiments, only the shift of the image IM of the same level as the first pixel shift driving may be performed, and the reduction of the image IM and the enlargement of the image IM may not be performed.

The checking whether the change of the block grayscale value is greater than or equal to the threshold (e.g., a set or predetermined threshold) in the interest area IA (S120), the first pixel shift driving (S110), and the second pixel shift driving (S140) described above may be repeated as shown in the drawing.

Figure 16:
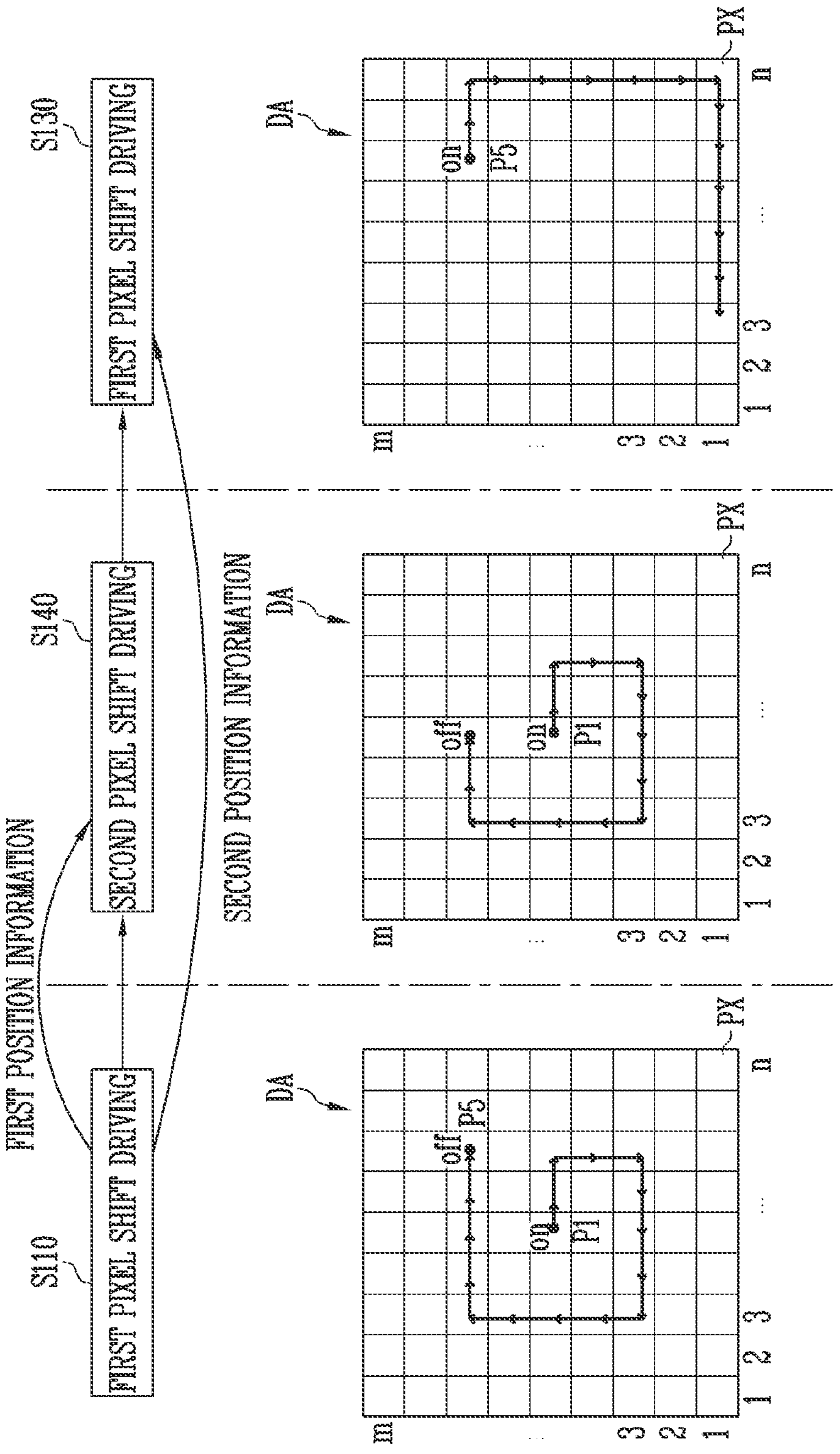
FIG. 16 is a conceptual diagram for describing a method of driving the display device according to one or more embodiments of the present disclosure.

FIG. 16 is a conceptual diagram for describing a method of driving the display device according to an embodiment of the disclosure.

FIG. 16 shows some steps of FIG. 7 and the display area DA corresponding to the steps. In FIG. 16, details regarding the checking whether the change of the block grayscale value is greater than or equal to the threshold (e.g., a set or predetermined threshold) in the interest area IA (S120) between each of the steps (e.g., S110, S120, S140) may not be repeated.

Referring to FIG. 16, in adjacent first pixel shift driving (S110) and (S130), a shift path of the image IM may be continuous. Even though the second pixel shift driving (S140) is performed between the adjacent first pixel shift driving (S110) and (S130), the shift path of the image IM in two adjacent first pixel shift driving (S110) and (S130) may be continuous.

For example, when the shift path of the image IM starts at the first point P1 and stops at the fifth point P5 in first first pixel shift driving (S110), the shift path of the image IM may start at the fifth point P5 in second first pixel shift driving (S110).

In the second pixel shift driving (S140), a path may always start at a fixed point. In one or more embodiments, the second pixel shift driving may start at the same first point P1 as the first point P1 of the first first pixel shift driving (S110). Here, the first point P1 is, for example, a point in which a pixel positioned in the center of the display area DA is positioned.

For example, in the first first pixel shift driving (S110), the shift path of the image IM may start at the first point P1 and may stop at the fifth point P5. Next, in the second pixel shift driving (S140), the shift path of the image IM may start at the first point P1. Next, in the second first pixel shift driving (S130), the shift path of the image IM may start at the fifth point P5 regardless of a position of a stopped point of the shift path of the image IM in a previous second pixel shift driving (S140).

For example, position information of a start point (e.g., first position information) for the shift path and position information of a stop point (e.g., second position information transmission) in the first pixel shift driving (S110) may be stored in the display device 10. The position information of the start point and the position information of the stop point may be used as start points for the shift path in the second pixel shift driving (S140) and the next first pixel shift driving (S130), respectively.

Hereinafter, various embodiments of the second pixel shift driving will be described with reference to [Table 1].

TABLE 1

| Embodiment | Shift range of image IM | Area reduced or enlarged in edge scaling area |
|---|---|---|
| First pixel shift driving | Maximum value | Entire area |
| Second pixel shift driving (first embodiment) | Maximum value | None |
| Second pixel shift driving (second embodiment) | Less than maximum value | Entire area |
| Second pixel shift driving (third embodiment) | Maximum value | Some areas |
| Second pixel shift driving (fourth embodiment) | Less than maximum value | None |
| Second pixel shift driving (fifth embodiment) | Less than maximum value | Some areas |

As described above, the second pixel shift driving (S140) may be divided based on the first pixel shift driving (e.g., (S110), (S130)). The following embodiments are described based on a fact that a shift range of the image IM has the maximum value in the first pixel shift driving, and the area reduced or enlarged in the edge scaling area is the entire area. In the first embodiment, the second pixel shift driving may be a driving in which the shift range of the image IM is the same as in the first pixel shift driving and only the image shift is performed without an area being reduced or enlarged in the edge scaling area.

In the second embodiment, the second pixel shift driving may be a driving in which the shift range of the image IM is less than that in the first pixel shift driving and the area being reduced or enlarged in the edge scaling area is the entire area.

In the third embodiment, the second pixel shift driving may be a driving in which the shift range of the image IM is the same as in the first pixel shift driving and some areas of the edge scaling area are reduced or enlarged.

In the fourth embodiment, the second pixel shift driving may be a driving in which the shift range of the image IM is less compared to the first pixel shift driving and only the image shift is performed without an area being reduced or enlarged in the edge scaling area.

In the fifth embodiment, the second pixel shift driving may be a driving in which the shift range of the image IM is less than in the first pixel shift driving and some areas of the edge scaling area are reduced or enlarged.

When the display device 10 is driven in the method according to the above-described embodiments, even though the image IM to be displayed includes the scroll area SCA in which a subtitle, text information, or the like shifts at a high speed, deterioration of the pixels PX may be minimized or reduced and visual recognition of an afterimage to the user may be minimized or reduced.

Next, the display device 10 and a method driving the display device 10 according to still other embodiments will be described. Hereinafter, description of the same components on the drawing as in FIGS. 1-16 may not be repeated, and the same or similar reference numerals will be used for the same components on the drawing as in FIGS. 1-16.

Figure 17:
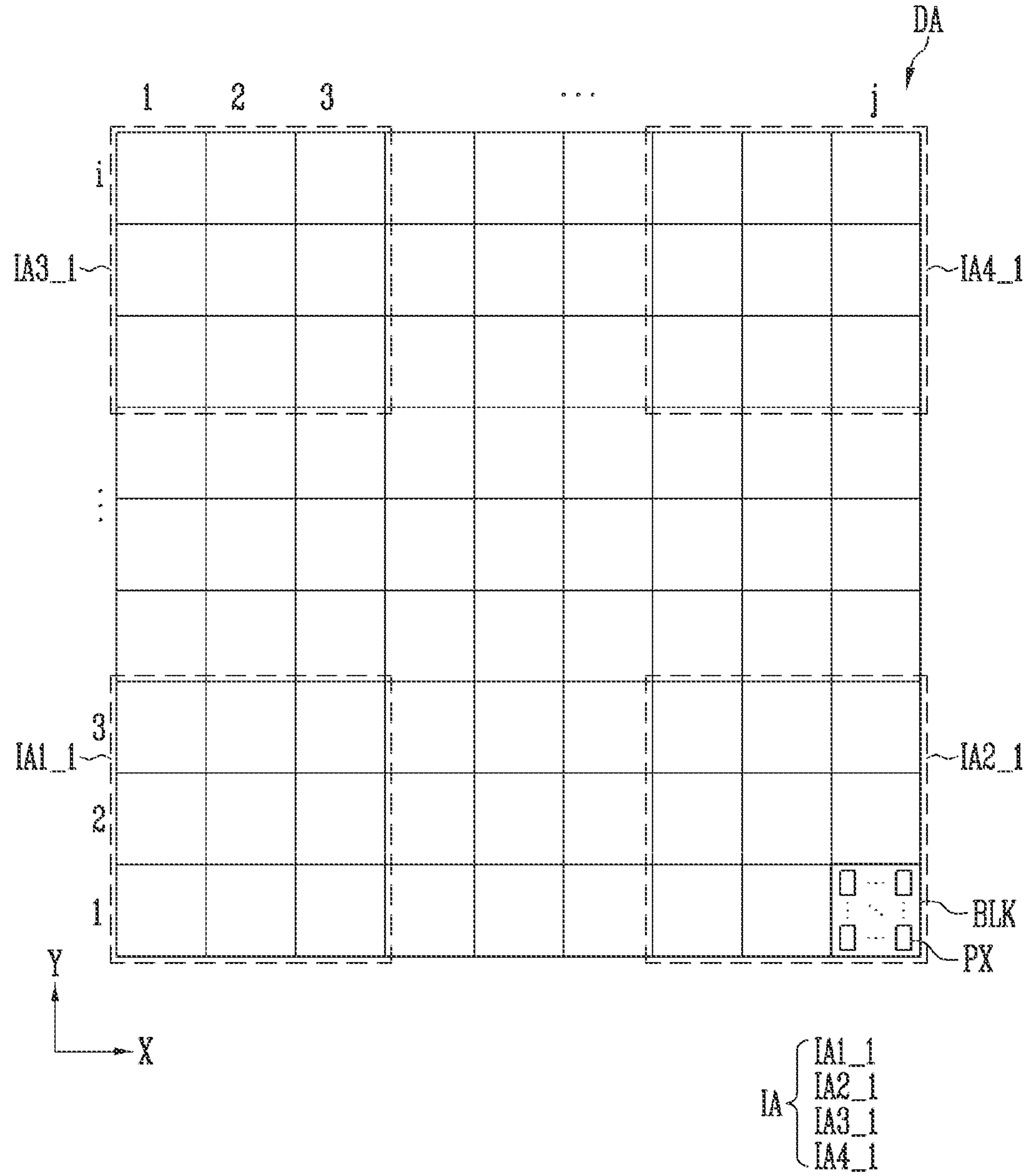
FIG. 17 is a conceptual diagram illustrating the pixel blocks in the display device according to still another embodiment of the present disclosure.

FIG. 17 is a conceptual diagram illustrating the pixel blocks in the display device according to still another embodiment.

Referring to FIG. 17, the present embodiment may be different from the embodiment of FIG. 6 in that set first to fourth interest areas IA1_1 to IA4_1 are positioned to be in contact with the four corners of the display area DA. For example, in FIG. 17, each of first to fourth interest areas IA1_1 to IA4_1 may include at least one corner from among the four corners of the display area DA.

Figure 18:
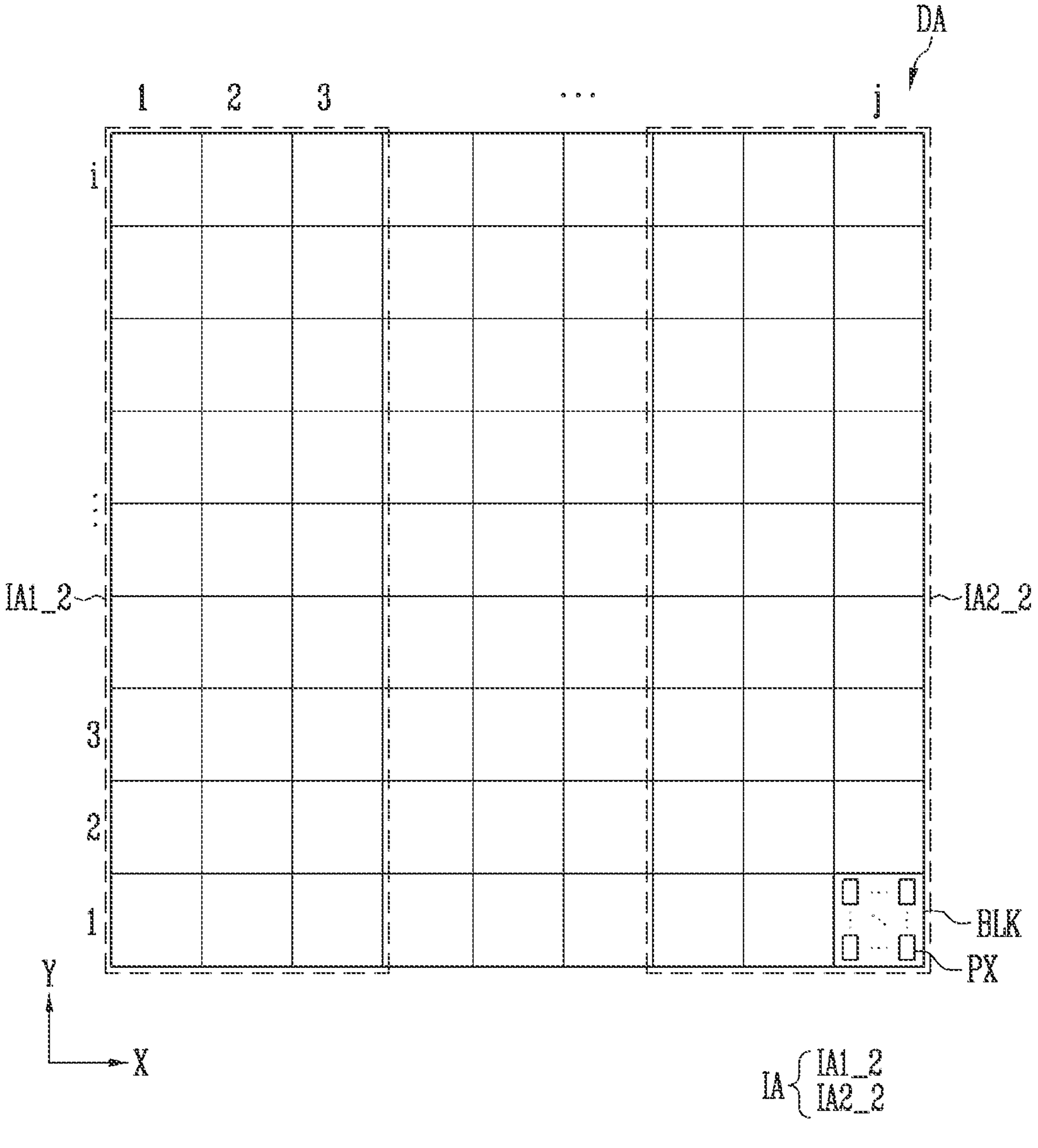
FIG. 18 is a conceptual diagram illustrating the pixel blocks in the display device according to still another embodiment of the present disclosure.

FIG. 18 is a conceptual diagram illustrating the pixel blocks in the display device according to still another embodiment.

Referring to FIG. 18, the present embodiment may be different from the embodiment of FIG. 6 in that the set interest area IA includes a first interest area IA1_1 and a second interest area IA2_2, and each of the first interest area IA1_1 and the second interest area IA2_2 are positioned to be in contact with at least two corners and at least one side of the display area DA. For example, each of the first interest area IA1_1 and the second interest area IA2_2 may be positioned to be fully in contact with at least two corners and at least one side of the display area DA along the Y-axis direction Y and may be partially in contact with at least two sides of the display area DA along the X-axis direction X.

In addition to those shown in FIGS. 6, 17 and 18, the interest area IA may be set to have various shapes.

Although the embodiments of the present disclosure have been described with reference to the accompanying drawings, it will be understood by those skilled in the art to which the disclosure pertains that the embodiments may be implemented in other specific forms without changing the technical spirit and essential features of the disclosure. Therefore, it should be understood that the embodiments described above are illustrative and are not restrictive in all aspects.

What is claimed is:

1. A method of driving a display device comprising a display area to display an image, the method comprising:

performing a first first pixel shift driving by shifting an image in a first range;

performing a second pixel shift driving by shifting the image in a second range smaller than the first range when the image includes a scroll area; and performing a second first pixel shift driving when the image does not include the scroll area.

2. The method according to claim 1, wherein the second first pixel shift driving is performed after the second pixel shift driving is performed.

3. The method according to claim 2, wherein:

in the first first pixel shift driving, the image shift starts at a first point and stops at a second point, and in the second pixel shift driving, the image shift starts at the first point and stops at a third point.

4. The method according to claim 3, wherein:

in the second first pixel shift driving, the image shift starts at the second point.

5. The method according to claim 1, wherein in the second first pixel shift driving, the image is shifted in the first range.

6. The method according to claim 1, wherein in the first first pixel shift driving, the image is shifted with enlargement or reduction of the image.

7. The method according to claim 6, wherein in the second pixel shift driving, the image is shifted without enlargement or reduction of the image.

8. The method according to claim 7, wherein in the second first pixel shift driving, the image is shifted with enlargement or reduction of the image.

9. The method according to claim 6, wherein in the second pixel shift driving, the image is shifted with enlargement or reduction of the image.

10. The method according to claim 1, wherein the scroll area includes at least one of a subtitle and text information.

11. A display device comprising:

a display area to display an image; and a controller to control the image, wherein the controller is to perform a first first pixel shift driving by shifting the image in a first range, wherein the controller is to perform a second pixel shift driving by shifting the image in a second range smaller than the first range when the image includes a scroll area, and wherein the controller is to perform a second first pixel shift driving when the image does not include the scroll area.

12. The display device according to claim 11, wherein the second first pixel shift driving is performed after the second pixel shift driving is performed.

13. The display device according to claim 12, wherein:

in the first first pixel shift driving, the image shift is to start at a first point and to stop at a second point, and in the second pixel shift driving, the image shift is to start at the first point and to stop at a third point.

14. The display device according to claim 13, wherein:

in the second first pixel shift driving, the image shift is to start at the second point.

15. The display device according to claim 11, wherein in the second first pixel shift driving, the image is shifted in the first range.

16. The display device according to claim 11, wherein in the first first pixel shift driving, the image is shifted with enlargement or reduction of the image.

17. The display device according to claim 16, wherein in the second pixel shift driving, the image is shifted without enlargement or reduction of the image.

18. The display device according to claim 17, wherein in the second first pixel shift driving, the image is shifted with enlargement or reduction of the image.

19. The display device according to claim 16, wherein in the second pixel shift driving, the image is shifted with enlargement or reduction of the image.

20. The display device according to claim 11, wherein the scroll area includes at least one of a subtitle and text information.

* * * * *